United States Patent
Hoshino et al.

(12) 
(10) Patent No.: US 6,523,413 B1
(45) Date of Patent: Feb. 25, 2003

(54) ACOUSTIC INSPECTION METHOD FOR HARD DISKS, ACOUSTIC INSPECTION SYSTEM FOR HARD DISKS, AND PROGRAM MEMORY MEDIUM

(75) Inventors: Takenori Hoshino, Tokyo (JP); Masamitsu Miki, Tokyo (JP); Yoshimi Maehara, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/473,358

(22) Filed: Dec. 28, 1999

(30) Foreign Application Priority Data

Dec. 28, 1998 (JP) .......................................... 10-373824

(51) Int. Cl.⁷ ................................................ G01H 1/00
(52) U.S. Cl. ...................................................... 73/660
(58) Field of Search .......................... 73/105, 660, 659, 73/958, DIG. 1

(56) References Cited

U.S. PATENT DOCUMENTS 5,488,857 A * 2/1996 Homma et al. ............... 73/105

FOREIGN PATENT DOCUMENTS

JP 4-283421 10/1992
JP 10-206340 8/1998

* cited by examiner

*Primary Examiner*—Richard A. Moller
(74) *Attorney, Agent, or Firm*—Venable, Baetjer, Howard & Civiletti, LLP; Robert J. Frank; Michael A. Sartori

(57) ABSTRACT

The invention has been developed to find out a blemish on the surface of a disk (in particular, a stroke mark in the CSS area) without opening up a hard disk. Furthermore, the invention is intended not to cause extra labor or cost in fabrication of hard disks, and to be applicable to hard disk already in widespread use. To this end, with an acoustic inspection method of the invention, inspection of whether or not a blemish has been inflicted on the surface of a disk (in particular, a blemish in the CSS area) can be conducted without opening up the hard disk by detecting vibration occurring when a head of the hard drive comes into collision with the blemish on the disk from vibration propagating to a housing of the hard disk.

26 Claims, 35 Drawing Sheets

| INSPECTION NO. | TYPE OF HARD DISK | ANALYSIS RESULTS | SCORE |
|---|---|---|---|
| 1 | | | |
| 2 | | | |
| ⋮ | | | |
| n | | | |

FIG. 27

| INSPECTION NO. | TYPE OF HARD DISK | ANALYSIS RESULTS | SCORE | PCM DATA |
|---|---|---|---|---|
| 1 | | | | |
| 2 | | | | |
| ⋮ | | | | |
| n | | | | |

FIG. 30

ACOUSTIC INSPECTION METHOD FOR HARD DISKS, ACOUSTIC INSPECTION SYSTEM FOR HARD DISKS, AND PROGRAM MEMORY MEDIUM

BACKGROUND OF THE INVENTION

1. Field of the Invention

The present invention relates to an acoustic inspection method. In particular, it relates to an acoustic inspection system for a blemish on the surface of a disk (in particular, a stroke mark and the like in a contact-start-stop (CSS) inside a hard disk.

2. Description of the Related Art

There is available a type of hard disk, wherein the CSS area in which a head is standing by when a power source is off is provided over a disk. It sometimes happens that in the case of a hard disk provided with the CSS area, the head thereof comes into collision with the CSS area due to vibration and so forth taking place during transportation of the hard disk, thereby inflicting a stroke mark on the disk.

FIG. 7 is a schematic illustration showing a relationship between a height of a stroke mark left in the CSS area of the hard disk and a height of the head. The figure shows that the head 101 has a height of 30 nm to 80 nm from the surface of the disk 100 when levitated by rotating the disk 100 while a stroke mark 103 has a height in the order of 15 nm to 50 nm. Such a stroke mark can not be discovered by an ordinary read-while-write check. The hard disk having the stroke mark as described will be susceptible to failure occurring in a few month time from the start of actual use due to dust and the like which will be generated when the head 101 collides with stroke mark 103.

Although the stroke mark as described above can be discovered by opening up the hard disk, a product value of the hard disk once opened up will be depreciated because dust and the like can be mixed therein. Accordingly, a procedure for inspection that can be conducted without opening up a hard disk has been highly desired.

Meanwhile, there are techniques as disclosed in Japanese Patent Laid-Open No. H4-283421 and Japanese Patent Laid-Open No. H10-206340, which are applicable to a method of checking a blemish on the surface of a disk in the process of manufacturing a hard disk.

The techniques described are to detect directly vibration of an arm by fixing a mechanism for inspecting the vibration to the arm to which the head is attached, thereby deciding whether or not a blemish has been inflicted on the basis of the vibration.

However, since the conventional inspection method as described above requires a mechanism for inspecting the vibration, it takes time and cost to manufacture the mechanism. Further, the conventional inspection method can not be applied to hard disks already in widespread use. Furthermore, the described method is not applicable to inspection of fully fabricated hard disks because direct access to the arm is not possible once a cover for the hard disks is attached.

SUMMARY OF THE INVENTION

It is an object of the invention to detect a blemish on the surface of a hard disk (in particular, a stroke mark in the CSS area) without opening up the disk. Furthermore, it is intended that the invention not require extra labor or cost in fabrication of the hard disk, and is applicable to hard disks already in widespread use.

To this end, in accordance with a first aspect of the invention, there is provided an acoustic inspection method for hard disks, wherein an inspection for a blemish on a disk is conducted by picking a vibration occurring upon a head of a hard disk coming in collision with the blemish on the surface of the disk from a vibration propagating to a housing of the hard disk.

According to the first aspect of the invention, the inspection may be conducted during a period of time when driving of the disk is stopped, and the disk is in rotation by inertia.

In accordance with a second aspect of the invention, there is provided an acoustic inspection system for hard disks, comprising pickup means for picking up a vibration occurring upon a head of a hard disk coming in to collision with a blemish on the surface of the disk from a vibration propagating to a housing of the hard disk.

According to the second aspect of the invention, the pickup means may be a contact microphone.

Further, according to the second aspect of the invention, the pickup means may be is an optical head.

Still further, according to the second aspect of the invention, there may be provided means for amplifying the vibration picked up by the pickup means in the form of sound, and outputting the same externally.

Yet further, according to the second aspect of the invention, there may be provided a display for displaying the vibration picked up by the pickup means as a waveform.

Further, according to the second aspect of the invention, there may be provided storage means for converting the vibration picked up by the pickup means into digital values, and storing the same.

According to the second aspect of the invention, and with the features described above, there may be provided detection means for detecting a sound caused by the head of the hard disk coming in collision with the blemish on the surface of the disk on the basis of the vibration stored by the storage means.

Still further, according to the second aspect of the invention, and with the foregoing features, the detection means may have functions of controlling a power source for the hard disk, monitoring a condition of vibration, and varying an amplification factor of a sound to be outputted externally.

Yet further, according to the second aspect of the invention, and with the foregoing features, the detection means may have a function of notifying an observer of a time at which the disk is ready for inspection.

Further, according to the second aspect of the invention, and with the foregoing features, there may be provided means for applying a wavelet transform to the vibration converted into the digital values.

Still further, according to the second aspect of the invention, and with the foregoing features, the detection means may slice a time region immediately before rotation of the disk comes to a stop on the basis of the vibration stored by the storage means, and may carry out an analysis for the blemish in the CSS area of the disk.

Yet further, according to the second aspect of the invention, and with the foregoing features, the detection means may carry out an analysis for the blemish on the surface of the disk by use of a ratio of peak levels of acoustic data to average levels thereof.

Further, according to the second aspect of the invention, and with the foregoing features, the detection means may carry out an analysis for the blemish on the surface of the disk by use of the periodicity of peak levels appearing in acoustic data, and the deceleration characteristic of a spindle of the hard disk.

Still further, according to the second aspect of the invention, and with the foregoing features, the detection means may be capable of storing parameters for a plurality of types of hard disks, and carrying out an analysis for the blemish on the surface of the disk by use of parameters corresponding to respective types of hard disks to be inspected.

Yet further, according to the second aspect of the invention, and with the foregoing features, there may be provided a storage means for storing at an inspection acoustic data in an original sound condition.

In accordance with a third aspect of the invention, there is provided a program medium storing a program whereby an analysis for the blemish on the surface of the disk is carried out by use of a ratio of peak levels of the acoustic data to average levels thereof on the basis of vibration propagating to the housing of the hard disk, or an analysis for the blemish on the surface of the disk is carried out by use of the periodicity of the peak levels appearing in the acoustic data, and the deceleration characteristic of the spindle of the hard disk.

Finally, according to the first aspect of the invention, the inspection may be conducted in a reduced-pressure chamber.

BRIEF DESCRIPTION OF THE DRAWINGS

FIG. 27 is a view showing an example of data stored in a storage unit;

FIG. 30 is a view showing an example of data stored in a storage unit;

DETAILED DESCRIPTION OF THE PREFERRED EMBODIMENTS

Figure 1:
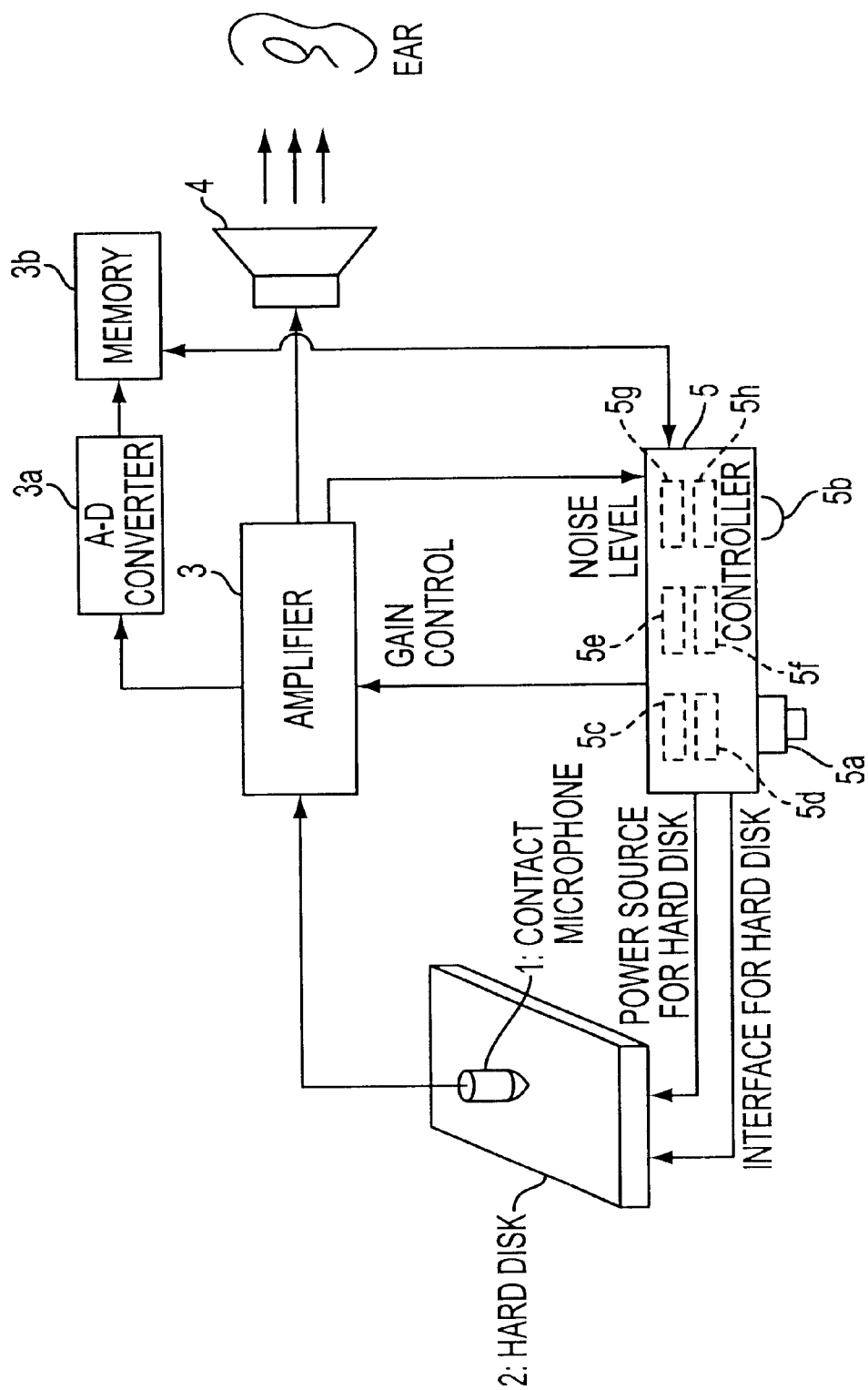
FIG. 1 is a functional block diagram showing an embodiment of an acoustic inspection system for hard disks according to the invention.

It is an object of the invention to enable a blemish on the surface of a hard disk (in particular, a stroke mark in the CSS area) to be found without opening up the hard disk, Further, it is intended that the invention will not cause extra labor or cost in fabrication of hard disks, and is applicable to hard disks already in widespread use.

To this end, the invention has been developed so that inspection of whether or not a blemish has been inflicted on the surface of a disk (in particular, a blemish in the CSS area) can be conducted without opening up the hard disk by detecting vibration occurring when a head of the hard disk comes into collision with the blemish on the disk from vibration propagating to a housing of the hard disk.

It has been totally unexpected by the industry concerned that vibration occurring when the head of a hard disk comes into collision with a a blemish on a disk can propagate to the housing of the hard disk. Therefore, according to the techniques disclosed in, for example, Japanese Patent Laid-Open No. H4-283421 and Japanese Patent Laid-Open No. H10-206340, it was impossible to inspect whether or not a blemish has been inflicted on the disk unless the arm is provided with a special mechanism for detecting the vibration. On the other hand, according to the invention, an inspection for a blemish on a disk can be conducted without installing such a special mechanism as described.

The invention will be described in detail hereinafter with reference to the accompanying drawings. Respective figures are schematic representations merely to help understanding of the invention. Further, in the respective figures, parts in common are denoted by the same reference numerals, and description thereof is omitted.

First Embodiment

The invention is described in detail hereinafter taking an example of a case of inspecting for a blemish in the CSS area of a disk.

FIG. 1 is a functional block diagram showing an embodiment of an acoustic inspection system for hard disks according to the invention.

In the figure, reference numeral 1 designates a contact microphone as means for picking up vibration of a hard disk 2. The contact microphone 1 detects vibration propagating to a housing of the hard disk 2 when brought into contact with the housing, and generates analog electric signals. The contact microphone 1, having a mechanism wherein a vibrator is connected to a piezoelectric element, and vibration of the vibrator is directly transmitted to the piezoelectric element, is preferably used.

Reference numeral 3 designates an amplifier which amplifies the vibration propagating to the housing of the hard disk 2 as picked up by the contact microphone 1. The amplifier 3 has a variable amplification factor.

Reference numeral 3a designates an analog-to-digital converter for executing analog-to-digital conversion of an output from the contact microphone 1, amplified by the amplifier 3, and reference numeral 3b designates a memory for storing data obtained by digitizing the output from the contact microphone 1, amplified by the amplifier 3, by means of the analog-to-digital converter 3a.

Reference numeral 4 designates a speaker for sending out the output from the contact microphone 1, amplified by the amplifier 3, in sound form, and in place of the speaker 4, a headphone may be used.

Reference numeral 5 designates a controller comprising a start (switch) SW 5a for starting an inspection, a display light emitting diode (LED) 5b for notifying an observer of readiness for inspection, a circuit 5c for controlling ON/OFF of the power source of the hard disk 2, a circuit 5d for monitoring a condition of the hard disk 2, a circuit 5e for controlling an amplification factor of the amplifier 3, a circuit 5f for deciding on whether or not there is a noise from an output of the amplifier 3, a circuit 5g for storing data in the memory 3b or reading out the data therefrom, and a power source 5h for supplying power to the hard disk 2.

A connector for the power source of the hard disk 2 interconnects the hard disk 2 and the controller 5 to supply power from the controller 5 to the hard disk 2 while a connector serving as a signal interface interconnects the hard disk 2 and the controller 5 to control ON/OFF of the hard disk 2, and also to monitor a condition of the hard disk 2.

To describe briefly operation of the controller 5, upon detection of the start SW 5a being pressed down, the controller 5 turns the power source for the hard disk 2 ON, and monitors signals from the hard disk 2. With the elapse of a predetermined length of time after receiving a signal for readiness from the hard disk 2, and detecting a start-up of the hard disk 2, the controller 5 turns the power source for the hard disk 2 OFF. This causes a motor (not shown), which drives the hard disc 2, to be deenerized, so that the disk continues to rotate by inertia.

Upon turning the power source for the hard disk 2 OFF, the controller 5 issues a directive to the amplifier 3 to raise its amplification factor over a predetermined length of time. Upon receiving the directive, the amplifier 3 sends the output from the contact microphone 1, as amplified, to the controller 5 and the analog-to-digital converter 3a while raising the amplification factor up to a predetermined value. At this point in time, the controller 5 monitors noises contained in the output delivered from the amplifier 3 through the circuit 5f. The analog-to-digital converter 3a converts the output delivered from the amplifier 3 into digital data, and outputs the same to the memory 3b.

When the amplification factor of the amplifier 3 is raised to a predetermined value, the controller 5 notifies the observer that a timing ready for inspection has been reached by lighting the display LED 5b while causing the memory 3b to start storing the data delivered from the analog-to-digital converter 3a.

Thereafter, the rotation of the disk, caused by inertia, comes to a stop. Thereupon, at a point in time when the noise comes down to a value not greater than a predetermined value, the controller 5 issues a directive to the amplifier 3 to lower the amplification factor. Upon receiving the directive, the amplifier 3 brings down the amplification factor to a predetermined value. Further, the controller 5 causes the memory 3b to stop storing the data therein while notifying the observer that a timing ready for inspection has been passed by putting out the display LED 5b.

Figure 2A:
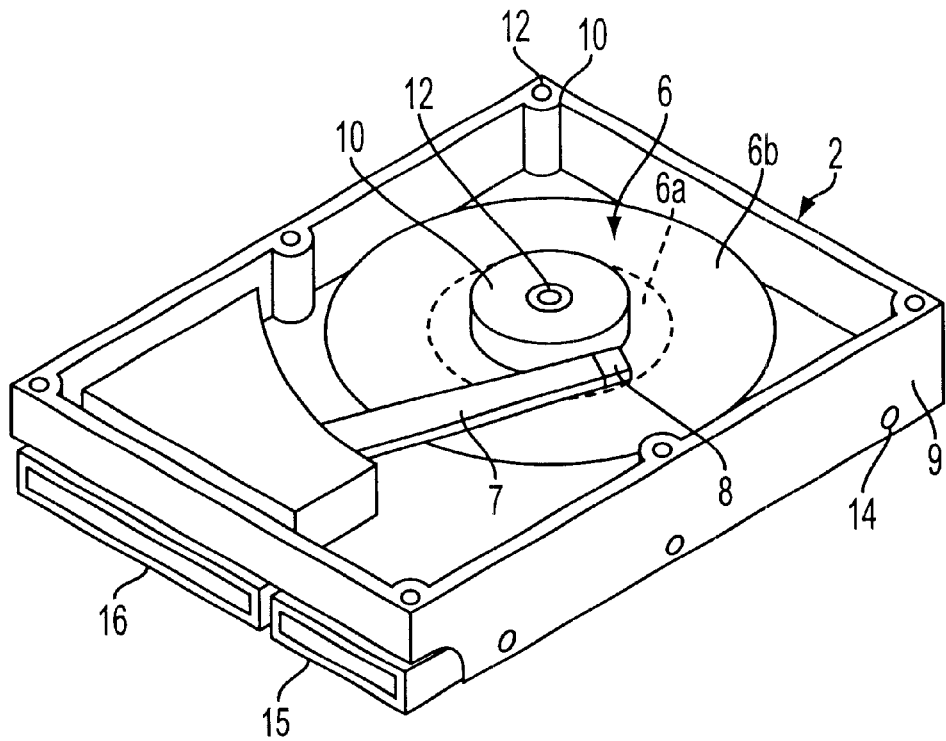
FIGS. 2(A) and 2(B) are perspective view showing the constitution of a hard disk by way of example.
Figure 2B:
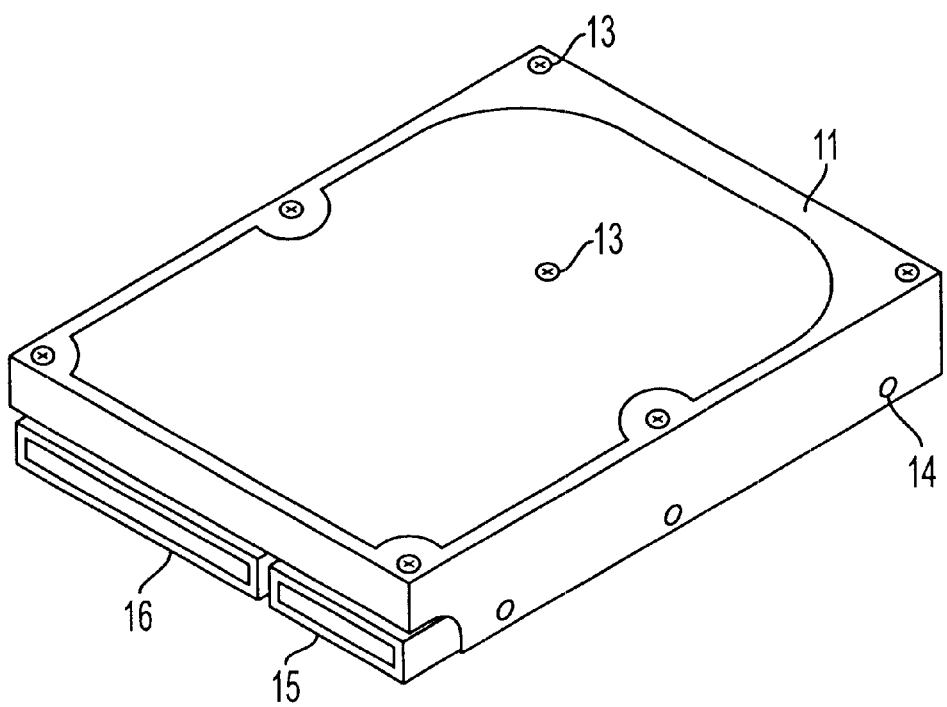

FIGS. 2(A) and 2(B) are perspective view showing a constitution of a hard disk by way of example, FIG. 2(A) showing a condition of the constitution of the hard disk without a cover attached thereto and FIG. 2(B) showing a condition thereof with the cover attached thereto.

Reference numeral 6 designates a sheet of disk or a plurality of sheets of disks, rotatable by a motor not shown in the figure. Reference numeral 7 designates an arm provided with a head 8 at the tip thereof, for reading data from or writing data to the disk 6 while the other end thereof is rotatably supported by a support mechanism so as to enable the arm 7 to be swingable along the surface of the disk 6 by a driving source not shown.

Reference numeral 9 designates a base provided with the disk 6, the motor (not shown) for rotating the disk 6, the support mechanism and a driving mechanism of the arm 7, a base plate, and so forth.

Reference numeral 10 designates a plurality of fixture mounts for supporting the cover 11 on the base 9, reference numeral 12 screw holes provided in the fixture mounts 10, reference numeral 13 screws for fixedly attaching the cover 11 to the base 9, and reference numeral 14 a screw hole for use when attaching the hard disk 2 to a computer, and the like.

Reference numeral 15 designates the connector for the power source for connection of the hard disk 2 with the power source, and reference numeral 16 the interface connector for connection of the hard disk 2 with a signal line.

Now, operation of the hard disk 2 is briefly described hereinafter. In the hard disk 2, a CSS area 6a where the head 8 is standing by keeping in contact with the disk 6 while the power source is turned OFF is positioned along the innermost periphery of the disk 6.

When the power source is turned ON, the hard disk 2 causes the disk 6 to start rotation. Upon rotation of the disk 6, the head 8 is levitated by an air current, and takes off from the CSS area 6a. Upon the head 8 taking off, the arm 7 is caused to swing, thereby moving the head 8 from the CSS area 6a to a read/write area 6b.

When the power source is turned OFF, the arm 7 is caused to swing back, thereby bringing the head 8 back to the CSS area 6a, and keeps rotating the disk 6 by inertia until the disk 6 comes to a complete stop. Accordingly as the disk 6 loses its rotational speed, the head 8 gradually descends, and lands on the CSS area 6a when the rotation of the disk 6 comes to a stop, whereupon the operation is completed.

Figure 3:
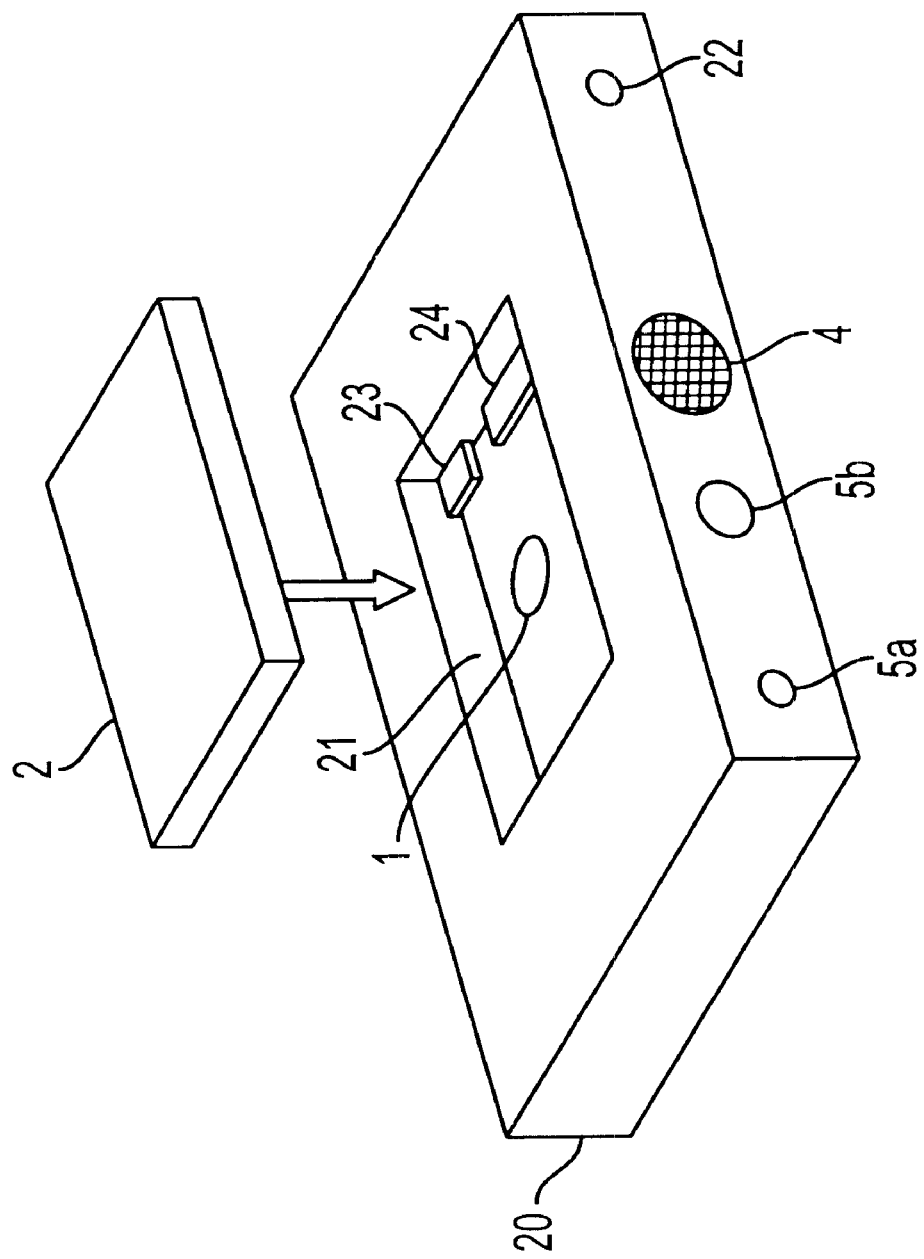
FIG. 3 is a perspective external view of the embodiment of the acoustic inspection system for hard disks according to the invention, showing a constitution thereof by way of example.

FIG. 3 is a perspective external view of the embodiment of the acoustic inspection system for hard disks according to the invention, showing a constitution thereof by way of example.

Reference numeral 20 designates the acoustic inspection system for hard disks, and reference numeral 21 a placement mount into which the hard disk 2, an object for inspection, is fitted.

As described previously with reference to FIG. 1, reference numeral 5a designates the start SW, reference numeral 1 the contact microphone, reference numeral 4 the speaker, and reference numeral 5b the display LED. Reference numeral 22 designates a headphone terminal capable of sending out sound outputted to the speaker 4 via a headphone (not shown)

Reference numeral 23 designates a power source connector for connection with the connector 15 for the power source of the hard disk 2, and reference numeral 24 an interface connector for connection with the interface connector 16 of the hard disk 2.

Figure 4:
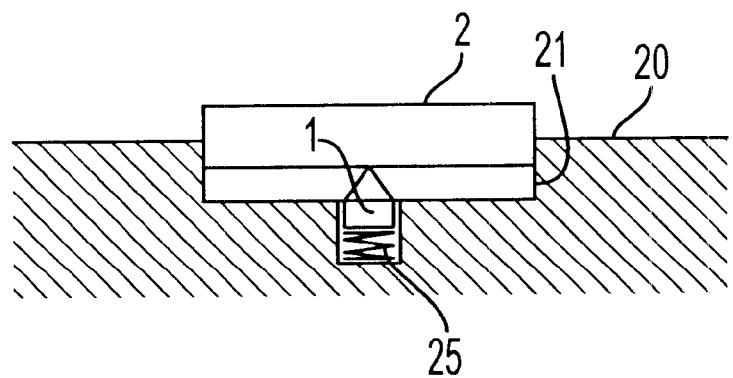
FIG. 4 is the schematic sectional view showing an attachment structure of the contact microphone by way of example.

FIG. 4 is a schematic sectional view showing an example of an attachment structure of the contact microphone 1 as described with reference to FIG. 3. The contact microphone 1 is attached to a bottom surface of the placement mount 21, and urged by a spring 25 so as to be to be projected from the bottom surface. The hard disk 2 is fitted into the placement mount 21 such that the cover 11 points downward. By fitting the hard disk 2 into the placement mount21, the contact microphone 1 is pressed from under by the spring 25 while the hard disk 2 sinks from above, so that the contact microphone 1 is brought into intimate contact with the hard disk 2. The contact microphone 1 has a mechanism for detecting vibration, formed in a pointed shape, By mounting pickup means formed in such a shape on either the screw 13 or in the screw hole 14, vibration of the hard disk 2 can be detected with excellent results.

Figure 5:
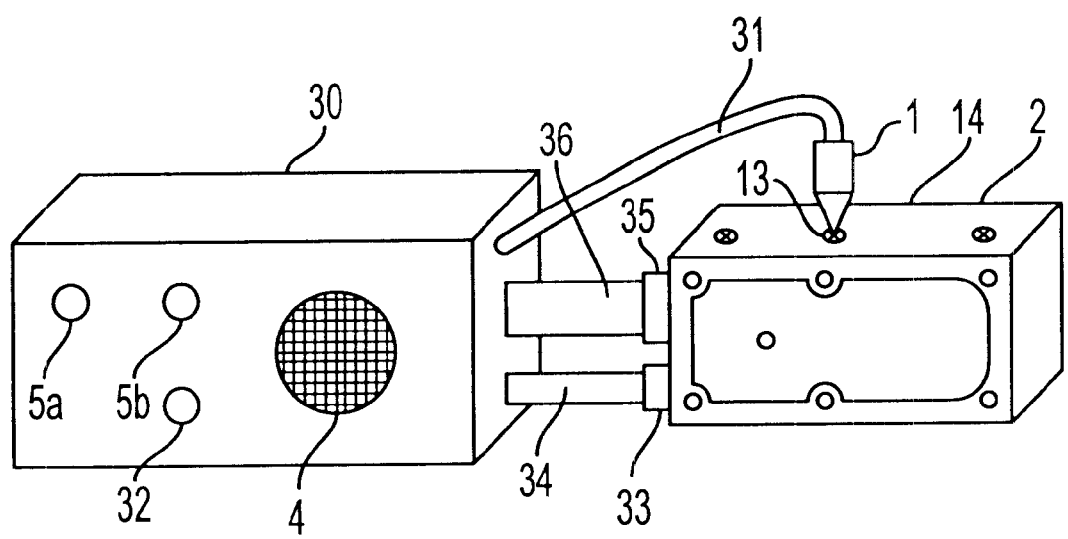
FIG. 5 is a perspective external view showing a variation to the embodiment of the acoustic inspection system for hard disks according to the invention.

FIG. 5 is a perspective external view showing a variation to the embodiment of the acoustic inspection system for hard disks according to the invention.

Reference numeral 30 designates an acoustic inspection system for hard disks, and as described previously with reference to FIG. 1, reference numeral 5a designates a start SW, reference numeral 1 a contact microphone, reference numeral 4 a speaker, and reference numeral 5b a display LED. Reference numeral 31 designates a cable connecting the contact microphone 1 with the acoustic inspection system for hard disks 30. Reference numeral 32 designates a headphone terminal capable of sending out a sound outputted to the speaker 4 via a headphone (not shown).

Reference numeral 33 designates a power source connector for connection with the connector 15 for the power source of the hard disk 2, reference numeral 34 a cable for interconnecting the power source connector 33 and the acoustic inspection system 30 for hard disks, reference numeral 35 an interface connector for connection with the interface connector 16 of the hard disk 2, and reference numeral 36 a cable for interconnecting the interface connector 35 and the acoustic inspection system 30 for hard disks.

The acoustic inspection system 30 for hard disks having a constitution shown in FIG. 5 is made up such that the contact microphone 1 is pressed in contact with the hard disk 2 by an observer. Since the contact microphone 1 has a mechanism for detecting vibration, formed in a pointed shape, vibration of the hard disk 2 can be detected with excellent results if the same is mounted on either the screw 13 or the screw hole 14.

Figure 6:
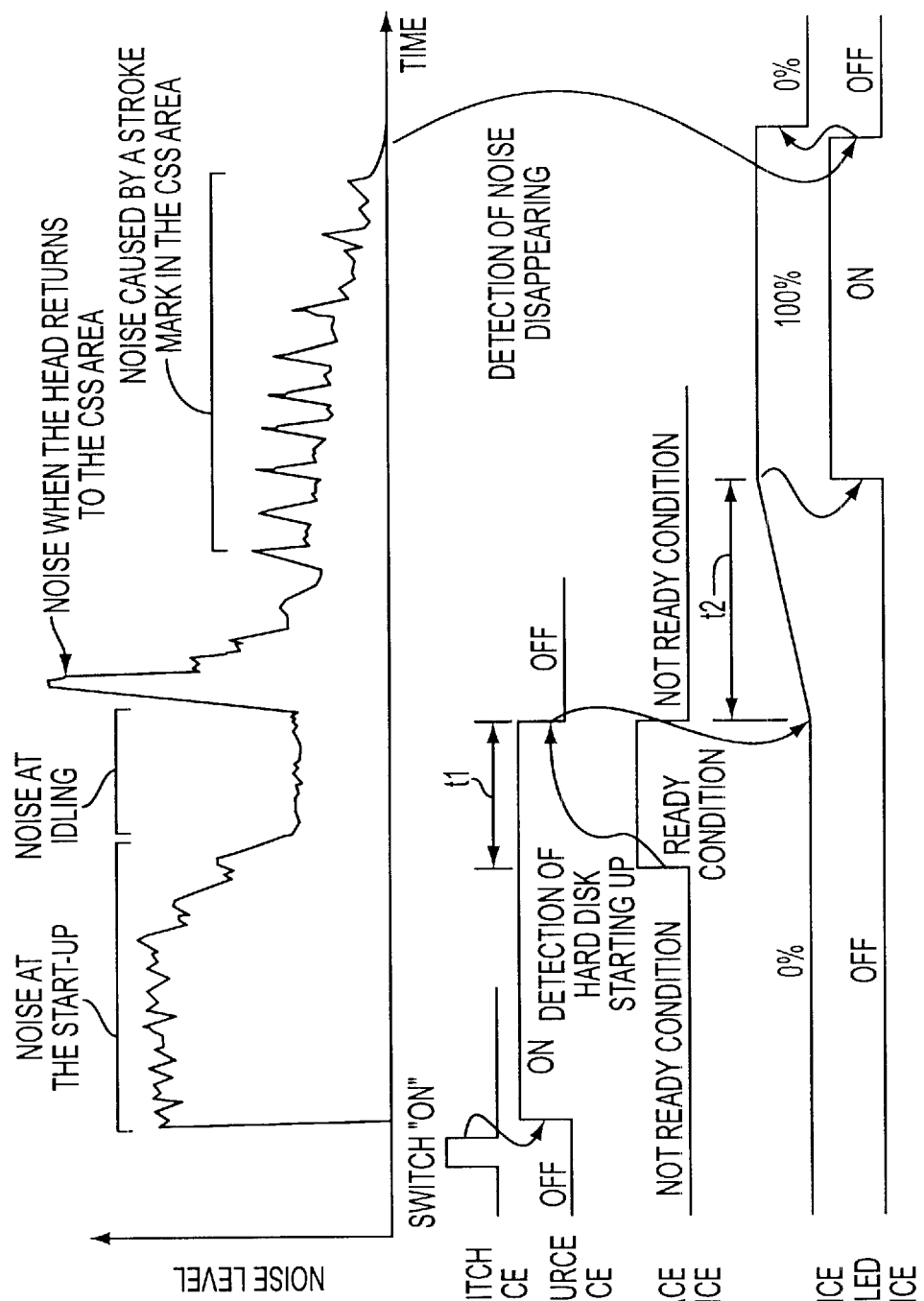
FIG. 6 is a time chart showing in detail the acoustic inspection method for hard disks according to the invention.

FIGS. 6(*a*)–6(*f*) depict is a time chart showing in detail an acoustic inspection method for hard disks according to the invention, and operation thereof is described in detail hereinafter. FIG. 6(*a*) is a graph showing a relationship between time elapsed and variation in a noise level with the vertical axis of the graph indicating the noise level and the horizontal axis thereof indicating time, FIG. 6(*b*) a start switch sequence graph showing a condition of the start SW 5a, FIG. 6(*c*) a power source sequence graph showing a control condition of the power source, FIG. 6(*d*) an interface sequence graph showing a condition of the hard disk 2, FIG. 6(*e*) a gain source sequence graph showing a condition of the amplifier 3, and FIG. 6(*f*) a display LED sequence graph showing a condition of the display LED 5b.

First, the hard disk 2 as an object for inspection is set into the acoustic inspection system for hard disks. In this case, if the acoustic inspection system for hard disks has the constitution as shown in FIG. 3, the hard disk 2 is fitted into the placement mount 21 with the cover 11 pointing downward. Thereupon, the connector 15 for the power source of the hard disk 2 is connected to the power source connector 23 of the acoustic inspection system 20 for hard disks, and the interface connector 16 of the hard disk 2 is connected to the interface connector 24.

Further, the contact microphone 1 comes into contact with the screw 13 of the hard disk 2.

In the case of the acoustic inspection system for hard disks having the constitution shown in FIG. 5, the power source connector 33 of the acoustic inspection system 30 for hard disks is connected to the connector 15 for the power source of the hard disk 2, the interface connector 35 is connected to the interface connector 16 of the hard disk 2, and the contact microphone 1 is brought into contact with the surface of the disk or housing 9 of the hard disk 2. In this case, if the contact microphone 1 is caused to be in contact with the screw 13 or the screw hole 14, provided on a side surface of the housing 9, vibration occurring to the hard disk 2 can be picked up with excellent results.

Having taken steps of operation as described above, the contact microphone 1 comes to be able to detect vibration occurring to the hard disk 2, and the controller 5 will be ready for driving the hard disk 2 and monitoring signals.

Subsequently, the start SW 5a is pressed down.

Upon detecting the start SW 5a in ON condition, the controller 5 turns the power source for the hard disk 2 ON, and issues a directive to start rotation, whereupon the disk 6 of the hard disk 2 is caused to start rotation. Upon the disk 6 starting rotation, the head 8 starts taking off in the CSS area 6a due to the effect of an air current, and levitation of the head 8 causes the arm 7 to swing and move the head 8 to the read/write area. Upon moving the head 8 to a predetermined position, the hard disk 2 outputs readiness for inspection. The controller 5 monitors signals sent out by the hard disk 2, and upon detecting start-up of the hard disk 2 by receiving notification of readiness therefrom, turns the power source for the hard disk 2 OFF after counting a predetermined time t1 from that point in time by use of a timer. The predetermined time t1 described above is a time elapsed between the start-up of the hard disk 2 and movement of the head 8 coming to a stop, equivalent to about one second.

When the power source for the hard disk 2 is turned OFF, the arm 7 is caused to swing, thereby bringing the head 8 back to the CSS area 6a, and as the disk 6 rotating by inertia gradually slows down in rotation, the head 8 starts landing thereon.

After turning the power source for the hard disk 2 OFF, the controller 5 counts again a predetermined time t2 from that point in time by use of the timer, and issues a directive to raise the amplification factor of the amplifier 3 gradually to a predetermined value, for example, from 0% to 100%, during the predetermined time t2. The predetermined time t2 described above is a length of time elapsed up to attenuation of noise which occurs upon the head 8 returning to the CSS area 6a, equivalent to about two seconds.

Upon receiving the directive described above, the amplifier 3 gradually raises the amplification factor to the predetermined value, and outputs vibration of the hard disk 2 in the form of sound through the speaker 4. Further, when the amplification factor of the amplifier 3 is raised to the predetermined value with the elapse of the predetermined time t2, the controller 5 causes the display LED 5b to light, thereby notifying the observer of readiness for inspection. In addition, when the amplification factor of the amplifier 3 is raised to the predetermined value with the elapse of the predetermined time t2, the controller 5 stores in the memory 3b the vibration of the hard disk 2 converted into digital data as outputted from the analog-to-digital converter 3a.

As described in the foregoing, until the elapse of the predetermined time t2 after turning the power source for the hard disk 2 OFF, subsequently to turning the power source for the hard disk 2 ON, the amplification factor of the amplifier 3 is "0%", so that the speaker 4 outputs no sound. As a result, noise occurring at the time of the start-up, sound of the motor in rotation, noise occurring upon the head 8 returning to the CSS area 6a, and the like will not be heard by the observer, thus precluding the observer from being misguided by such noises. However, at a point in time when the predetermined time t2 has elapsed after the power source for the hard disk 2 is turned OFF, the amplification factor of the amplifier 3 is rendered to reach "100%", so that the speaker 4 is caused to output a sound. At the point in time when the predetermined time t2 has elapsed after the power source for the hard disk 2 is turned OFF, the disk 6 is in rotation by inertia with the head 8 hovering over the CSS area 6a, and if a stroke mark is present in the CSS area 6a, the head 8 which starts descending comes into collision with the stroke mark, thereby causing vibration to be generated and propagated to the base 9 and the cover 11. Thus, it will be possible to decide on whether or not a stroke mark is present on the basis of the vibration in the form of sound outputted from the speaker 4. If, for example, a stroke mark is present at one spot, periodic sound can be heard.

Hereupon, since the disk 6 is in rotation by inertia as described above, only few other noises occur, so that a sound of the head 8 in collision with the stroke mark will not be buried in the other noises.

Hence, the observer can decide with ease on whether or not a stroke mark is present on the basis of the sound outputted from the speaker 4.

When the controller 5 receives an output from the contact microphone 1, amplified by the amplifier 3, and decides that a noise has reached a level not higher than a predetermined value, the controller 5 issues a directive to lower the amplification factor of the amplifier 3, and simultaneously, causes the display LED 5b to go out, thereby notifying the observer of completion of the inspection. Upon receiving the directive, the amplifier 3 lowers the amplification factor, and eliminates output from the speaker 4, thereby preventing the observer from hearing unnecessary noises.

Further, when the controller 5 decides that the noise has reached a level not higher than the predetermined value, the same stops storing the data in the memory 3b.

Thus, by digitizing and storing vibration of the hard disk 2 occurring from the point in time when the predetermined time t2 has elapsed after the power source for the hard disk 2 is turned OFF until a noise has reached the level not higher than the predetermined value, only data required for analysis can be stored.

Second Embodiment

Figure 7:
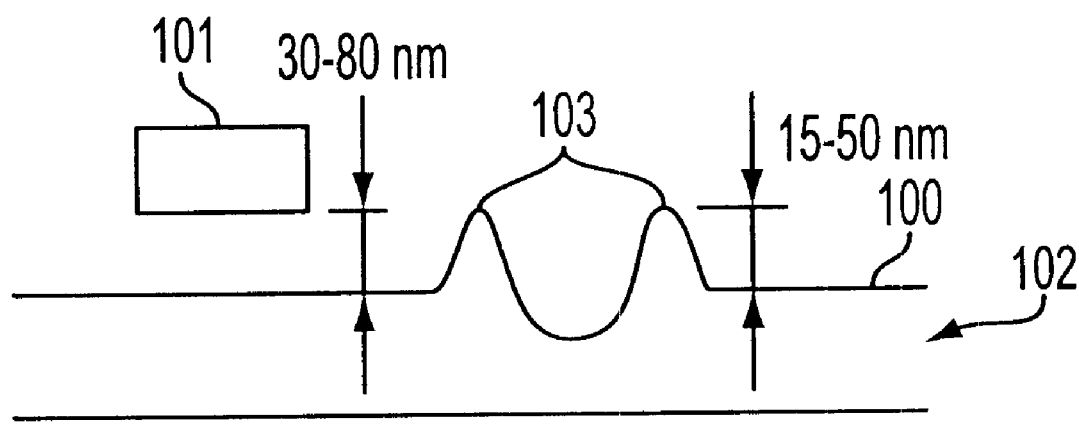
FIG. 7 is a schematic illustration showing a relationship between the height of a stroke mark and the height of the head.

With the first embodiment described above, the observer hears the vibration caused to occur due to collision of the head 101 (FIG. 7) with the stroke mark 103 left in the CSS area with his ears, thereby deciding on whether or not the stroke mark 103 is present. Accordingly, with the first embodiment, there are cases where a wrong decision is made by the observer due to a personal difference in his or her hearing sense and ambient noise at the time of inspection. Therefore, a second embodiment of an acoustic inspection system for hard disks according to the invention is made up such that vibration caused to occur due to collision of the head 101 with the stroke mark 103 left in the CSS area is shown as a waveform on a display, thereby enabling an observer to make a decision visually.

Figure 8:
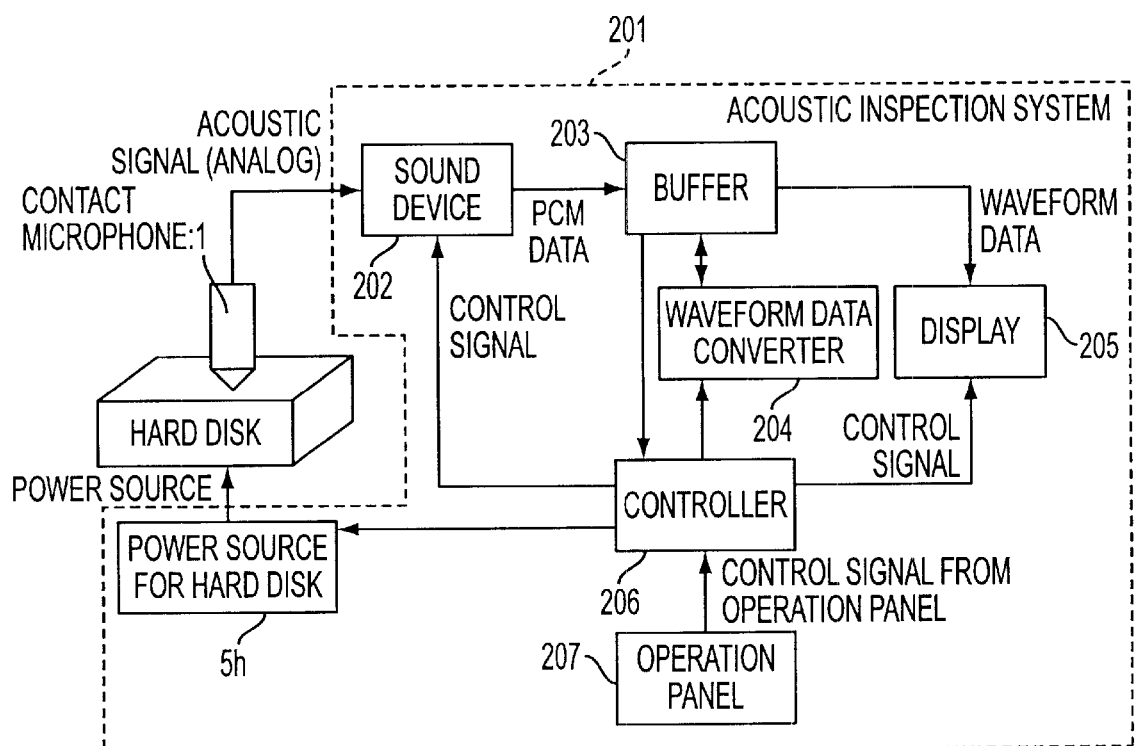
FIG. 8 is a view showing a constitution of a second embodiment of the invention.

FIG. 8 is a view showing a constitution of the second embodiment. Reference numeral 201 designates the acoustic inspection system for hard disks according to the second embodiment. Reference numeral 202 designates a sound device for receiving an output from a contact microphone 1, generating Pube-Code modulation (PCM) digital data from the output, and sending out PCM digital data to a buffer 203. The buffer 203 receives the PCM digital data from the sound device 202, and accumulates the same therein. Reference numeral 204 designates a waveform converter for reading out the PCM digital data from the buffer 203, and generating waveform data on the basis of a predetermined algorithm. Reference numeral 205 designates a display for receiving the waveform data generated by the waveform converter 204 via the buffer 203, and displaying the same. Reference numeral 206 designates a controller for controlling the entire inspection system. Reference numeral 207 designates an operation panel for receiving an input by an observer, and sending out to the controller 206 signals directing start or completion of an inspection and signals directing display position of the waveform data and display scaling.

Figure 9:
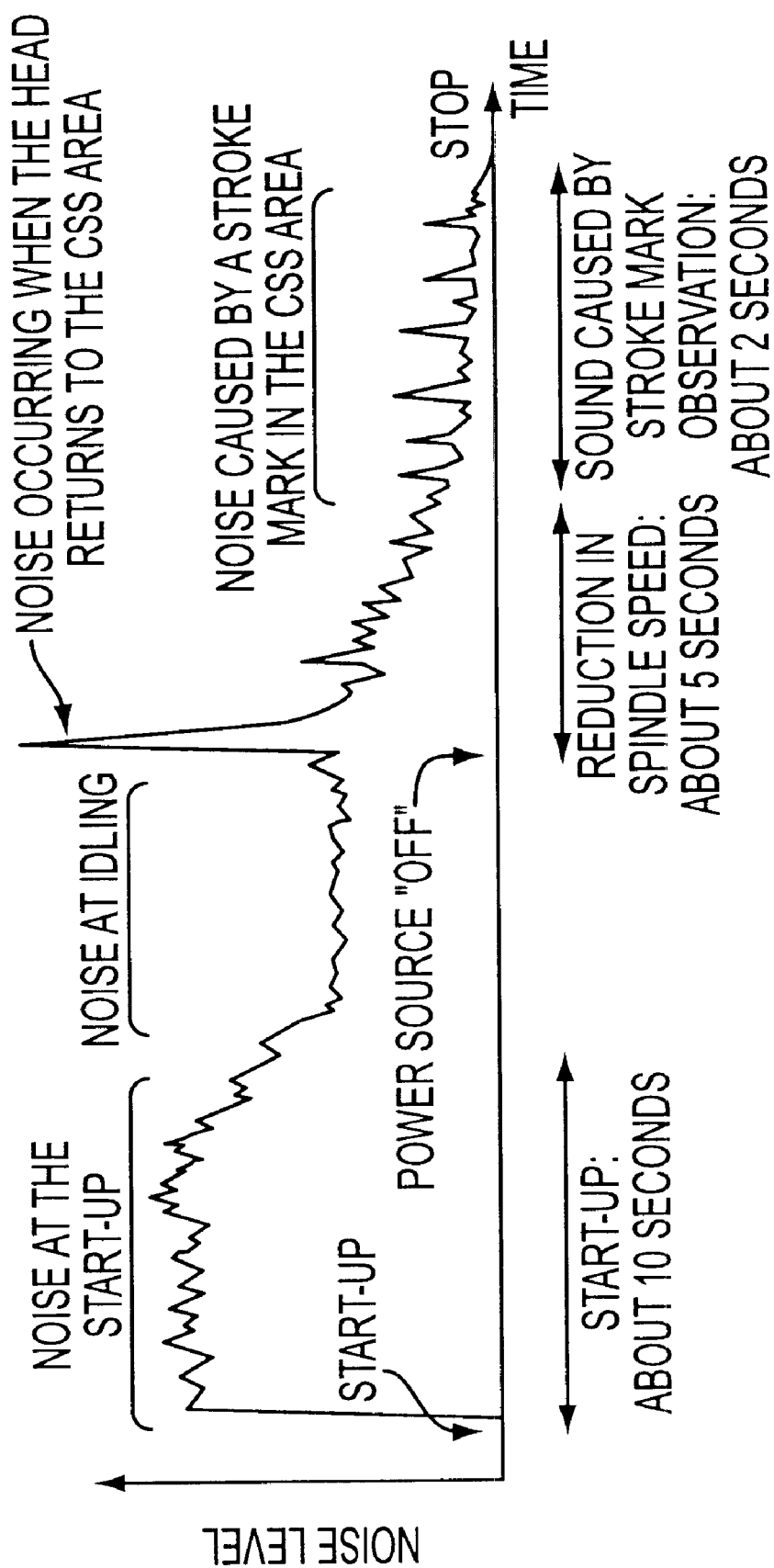
FIG. 9 is a time chart showing changes in vibration.

FIG. 9 is a time chart showing changes in vibration propagating to the housing 9 during a time period from the start-up of the hard disk 2 to a stoppage thereof. As shown in the figure, noise caused by the stroke mark 103 can not be checked during a normal operating condition (that is, at the times of the start-up, idling and so forth) owing to a high noise level due to the sound of the motor (not shown) in rotation, spurious sound from head 8, and so forth. However, for a short time after the power source is turned OFF, stopping rotation of the motor, the disk keeps rotating by inertia, whereupon the noise caused by the stroke mark 103 can be checked owing to a low level of noises other than that caused by the stroke mark 103.

Figure 10:
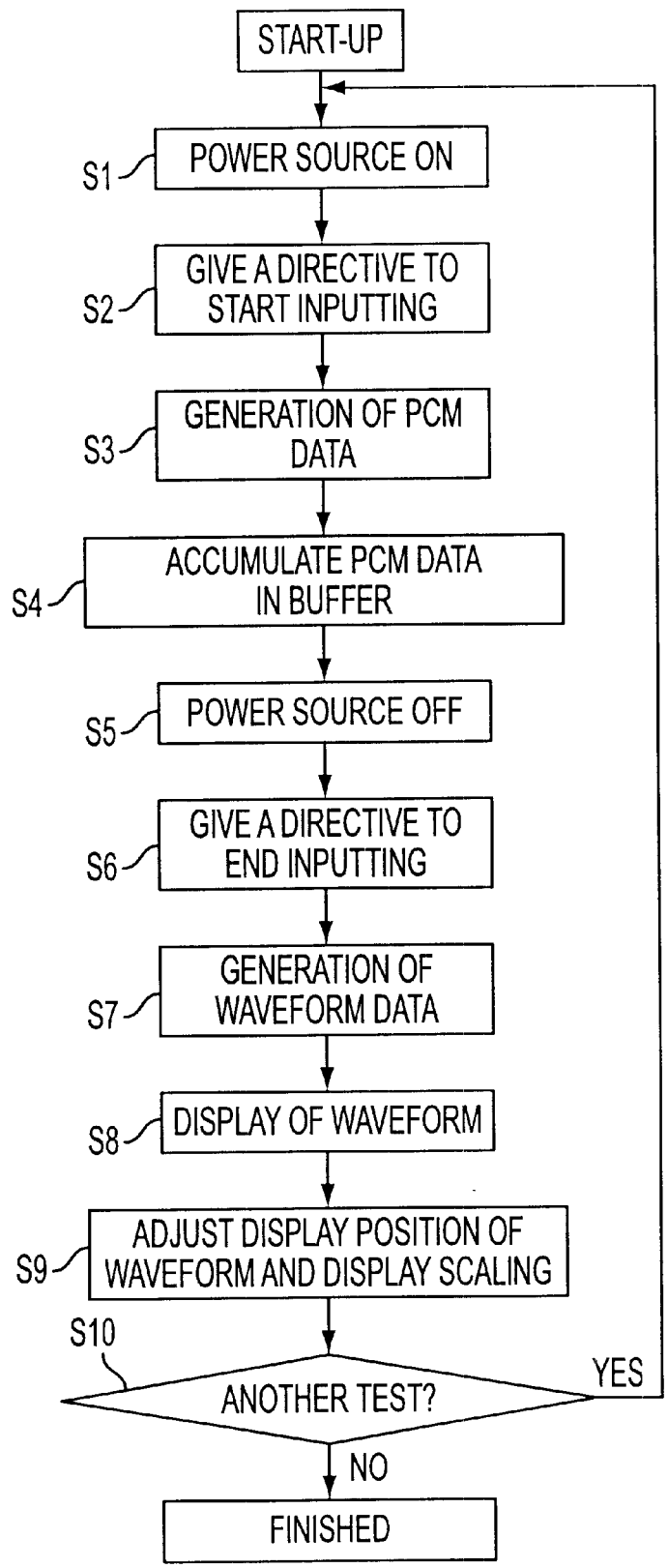
FIG. 10 is a flow chart showing steps of operation according to the second embodiment of the invention.
Figure 11:
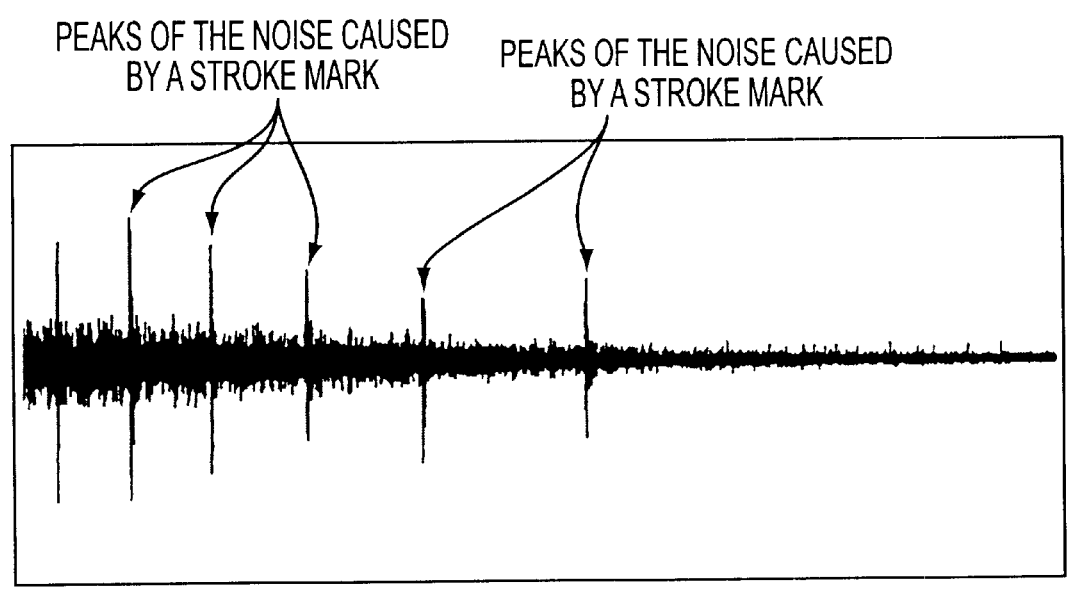
FIG. 11 is a view showing a waveform of noise caused by a stroke mark.

Now, operation of the second embodiment is described hereinafter with reference to FIGS. 10 and 11. FIG. 10 is a flow chart showing steps of operation according to the second embodiment, and FIG. 11 is a view showing a waveform of noise caused by a stroke mark, shown on the display, indicating presence of the stroke mark if periodic steep peaks appear.

An observer sets the hard disk 2 in the acoustic inspection system 201 for hard disks, and turns a power source ON by manipulating the operation panel 207 (step S1).

The observer waits for full start-up of the hard disk 2, and upon completion of the start-up, gives a directive to start inputting by manipulating the operation panel 207 (S2). Upon receiving the directive, the sound device 202 receives an output from the contact microphone 1, generates the PCM digital data from the output, and sends the PCM digital data to the buffer 203 (S3). The buffer 203 receives the PCM digital data from the sound device 202, and accumulates the same therein (S4).

The observer turns the power source for the hard disk 2 OFF by manipulating the operation panel 207, and stops rotation of a motor (not shown) (S5).

After the elapse of a predetermined time from a point in time when the rotation of the motor is stopped, the observer gives a directive to end inputting by manipulating the operation panel 207 (S6), whereupon the acoustic inspection system 201 for hard disks ends the fetching of data.

The waveform converter 204 reads out the PCM digital data from the buffer 203, and generates waveform data on the basis of the PCM digital data (S7). The display 205 receives the waveform data generated by the waveform converter 204 via the buffer 203, and displays the same (S8).

The observer manipulates the operation panel 207 so as to adjust the display position of the waveform data and the display scaling (S9). Thereupon, the observer makes a decision on whether or not a stroke mark is present on the basis of a waveform displayed by checking whether periodic steep peaks as shown in FIG. 11 appear or not.

Thereafter, the operation flow returns to the step S1 in case of inspecting another hard disk, and otherwise, inspection is finished (S10).

Thus, with the second embodiment, a decision on whether or not the stroke mark 103 is present can be made visually. Hence, the second embodiment is not susceptible to the effects of personal difference in hearing sense and the environment at the time of inspection, so that a decision on whether or not the stroke mark 103 is present can be made in a manner which is more stable than in the case of making a decision on whether or not the stroke mark 103 is present by relying on the observer's hearing sense.

Third Embodiment

Figure 14:
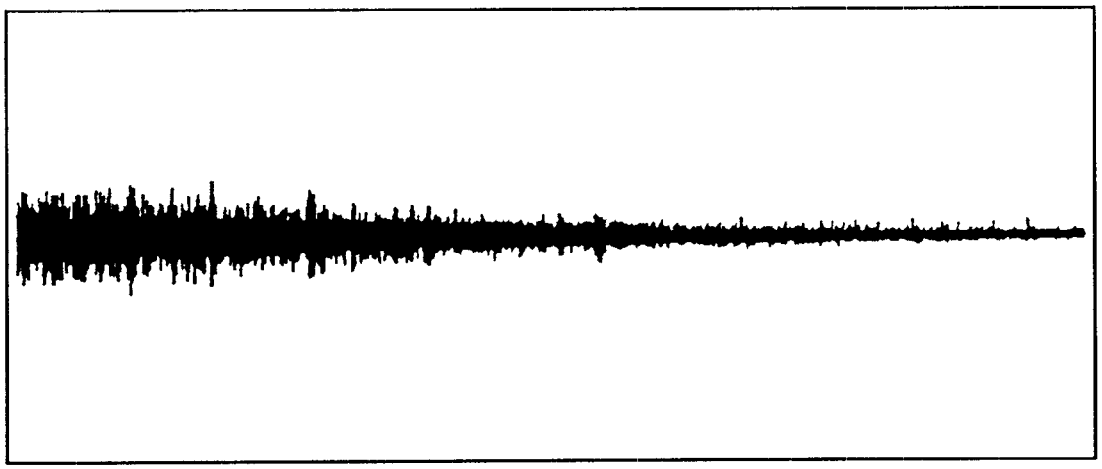
FIG. 14 is a waveform chart showing a waveform when a stroke mark is small.

With the second embodiment, in the case of the stroke mark 103 being large in size, that is, the level of the noise caused by the stroke mark 103 being high, the waveform shown in FIG. 11 appears. However, in the case of the stroke mark 103 being small in size, that is, the level of a noise caused by the stroke mark 103 being low, the waveform becomes that shown in FIG. 14. In such a case, the noise caused by the stroke mark 103 will be buried in other noise (for example, noise of a motor {not shown}, noise occurring on the surface of a disk, and so forth), and consequently, periodic steep peaks will not appear. Accordingly, in the case of the stroke mark 103 being small in size, an observer is unable to make a decision by simply watching the waveform. For this reason, a third embodiment of an acoustic inspection system for hard disks according to the invention has a constitution described hereinafter, so that the noise caused by the stroke mark 103 will appear in a well-defined waveform even in the case of the stroke mark 103 being small. FIG. 14 is a waveform chart according to the second embodiment, in the case of the stroke mark 103 being small.

Figure 12:
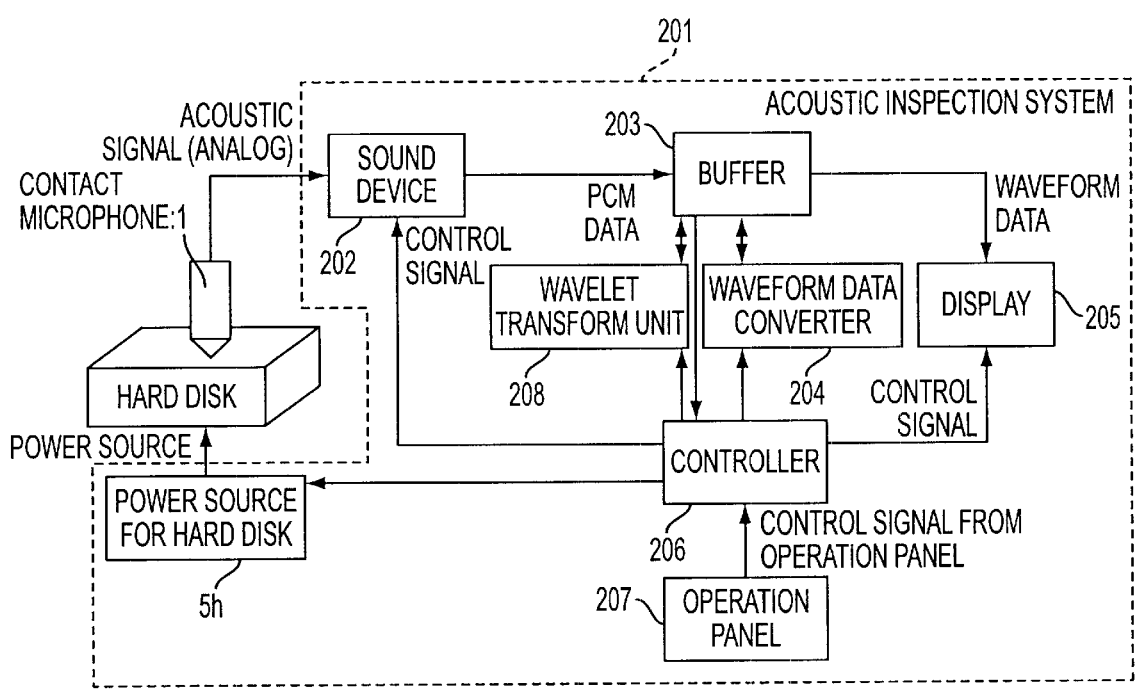
FIG. 12 is a view showing a constitution of a third embodiment of the invention.

That is, the third embodiment is made up by adding a wavelet transform unit to the second embodiment. FIG. 12 is a view showing a constitution of the third embodiment.

With the third embodiment, taking advantage of the nature of the noise caused by the stroke mark 103, periodically exhibiting steep peaks, data are converted into wavelets, thereby displaying a characteristic thereof over time. Wavelet transform being a known art as described in, for example, [Digital Signal Processing Handbook (compiled by the Institute of Electronics Information Communication Engineers)] (published by K. K Ohmsha on Jan. 31, 1993, under Sub-Section "Wavelet Transform", and accordingly, a detailed description thereof is omitted herein.

Figure 13:
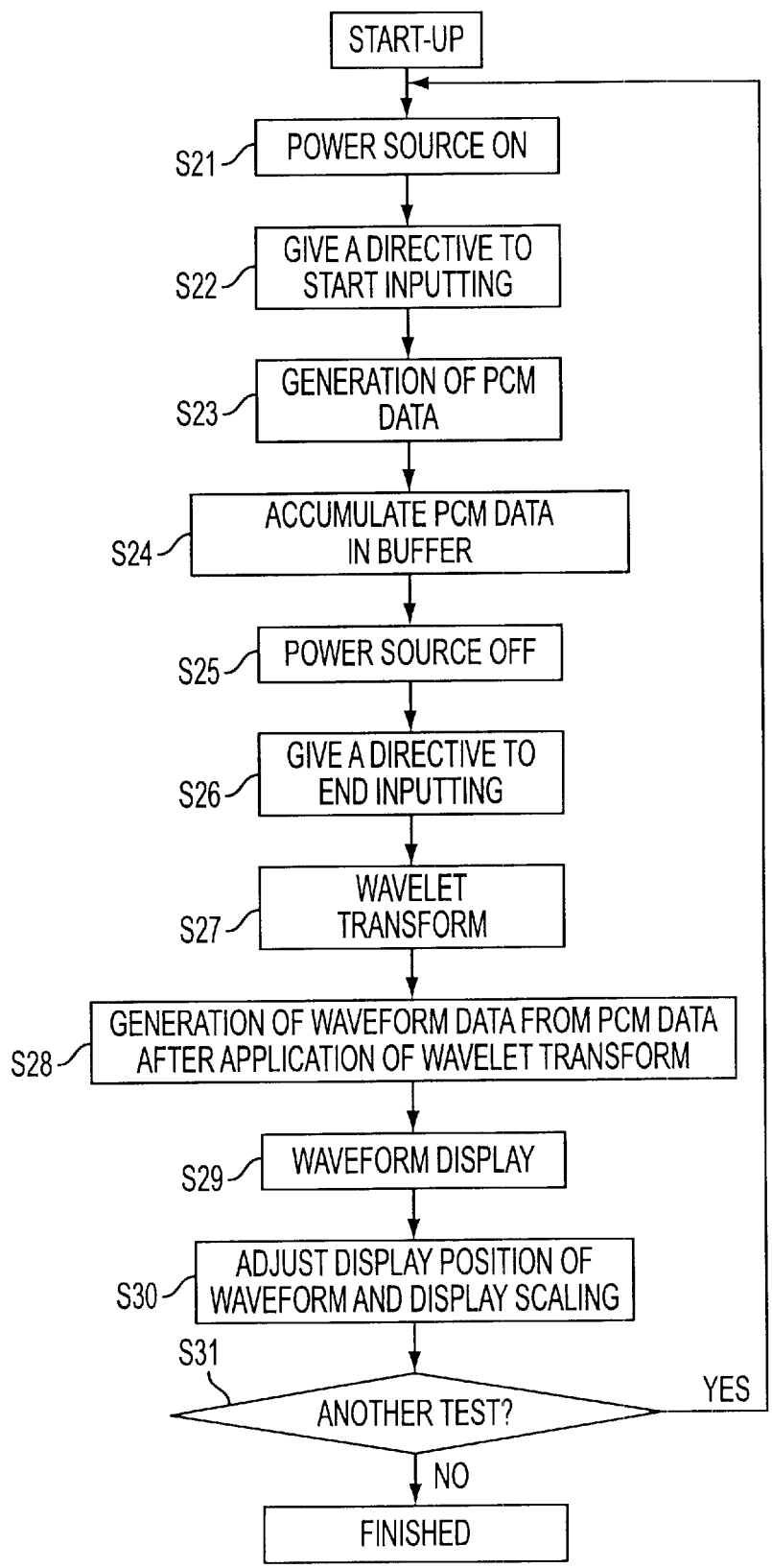
FIG. 13 is a flow chart showing operation of the third embodiment.

Operation of the third embodiment is described hereinafter with reference to FIG. 13. FIG. 13 is a flow chart showing the operation of the third embodiment.

An observer sets the hard disk 2 in the acoustic inspection system 201 for hard disks, and turns a power source ON by manipulating the operation panel 207 (S21).

The observer waits for full start-up of the hard disk 2, and upon completion of the start-up, gives a directive to start inputting by manipulating the operation panel 207 (S22). Upon receiving the directive, the sound device 202 receives an output from the contact microphone 1, generates the PCM digital data from the output, and sends the PCM digital data to the buffer 203 (S23). The buffer 203 receives the PCM digital data from the sound device 202, and accumulates the same therein (S24).

The observer turns the power source for the hard disk 2 OFF by manipulating the operation panel 207, and stops rotation of the motor (not shown) (S25).

After the elapse of a predetermined time from a point in time when the rotation of the motor is stopped, the observer gives a directive to end inputting by manipulating the operation panel 207 (S26), whereupon the acoustic inspection system 201 for hard disks ends the fetching of data.

The wavelet transform unit 208 reads out the PCM digital data from the buffer 203, generates the PCM digital data with the wavelet transform applied thereto, and transmits the same to the buffer 203 so as to be accumulated therein (S27). The waveform converter 204 reads out the PCM digital data with the wavelet transform applied thereto from the buffer 203, and generates waveform data on the basis of the PCM digital data with the wavelet transform applied thereto (S28). The display 205 receives the waveform data generated by the waveform converter 204 via the buffer 203, and displays the same (S29).

The observer manipulates the operation panel 207 so as to adjust the display position of the waveform data and the display scaling (S30). Thereupon, the observer makes a decision on whether or not a stroke mark is present on the basis of a waveform displayed by checking whether periodic steep peaks as shown in FIG. 11 appear or not.

Thereafter, an operation flow returns to the step S21 in case of inspecting another hard disk, and otherwise, inspection is finished (S31).

Figure 15:
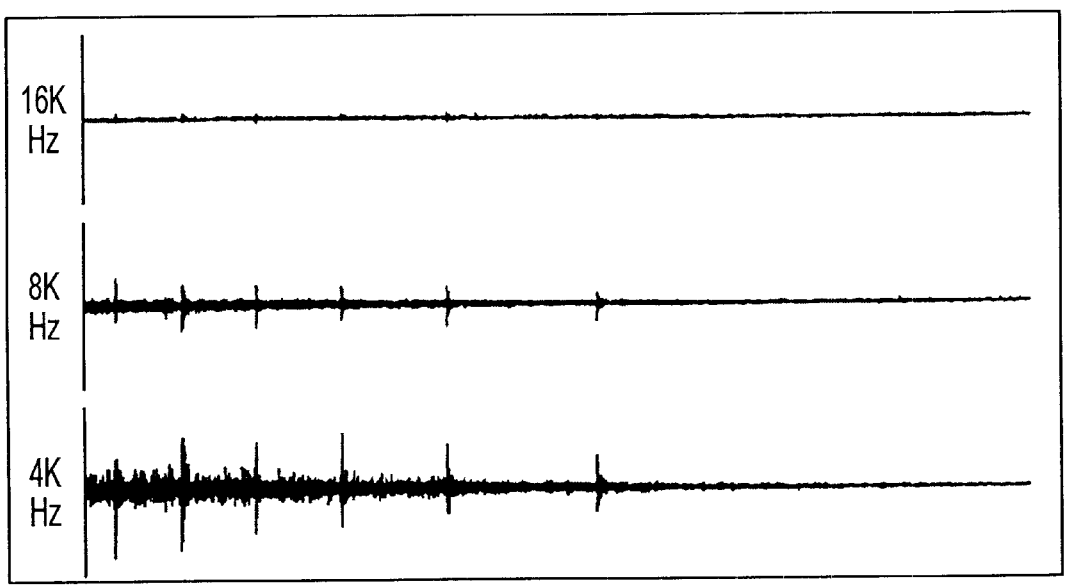
FIG. 15 is a waveform chart according to the third embodiment.

Now, with the wavelet transform, both frequency and time can be broken down simultaneously unlike, for example, a Fourier transform by which only frequency is broken down. Meanwhile, as a result of inspections, it has been found that periodic steep peaks are observed in the noises caused by the stroke mark 103, at frequencies in the vicinity of 4 KHz to 8 Khz, if the stroke mark 103 is small, and other noises are at relatively low levels in that frequency band. With the third embodiment, therefore, the PCM digital data are read out from the buffer 203, and broken down into data for each of a plurality of frequencies through the wavelet transform. As a result, it has become possible with the third embodiment that, as shown in FIG. 15, waveforms having periodic steep peaks are displayed at frequencies in the vicinity of 4 KHz to 8 Khz. This makes it possible for the observer to make a decision on whether or not the stroke mark 103 is present. FIG. 15 is a waveform chart of a stroke mark, indicating a case of the stroke mark being small.

As described in the foregoing, with the third embodiment, the characteristics of data over time can be displayed through the wavelet transform of the data. Hence, with the third embodiment, particularly even in the case of the stroke mark 103 being small, that is, the noise caused by the stroke mark 103 being at a low level, waveforms indicating periodic steep peaks can be displayed. Accordingly, with the third embodiment, a decision can be made with higher accuracy than in the case of the second embodiment.

Fourth Embodiment

With the third embodiment described above, all data fetched are subjected to the wavelet transform. However, since the wavelet transform requires floating point arithmetic in volume proportional to the length of data, a massive memory capacity (about 40 to 50 times the volume of an integer arithmetic) and processing time are needed for processing the data unless a child processor dedicated for use in executing the floating point arithmetic is mounted in an inspection system. Accordingly, with the fourth embodiment, a period of time during which the characteristic of the stroke mark 103 is exhibited intensely is sliced, so that for only such a time period, the wavelet transform is executed.

Figure 16:
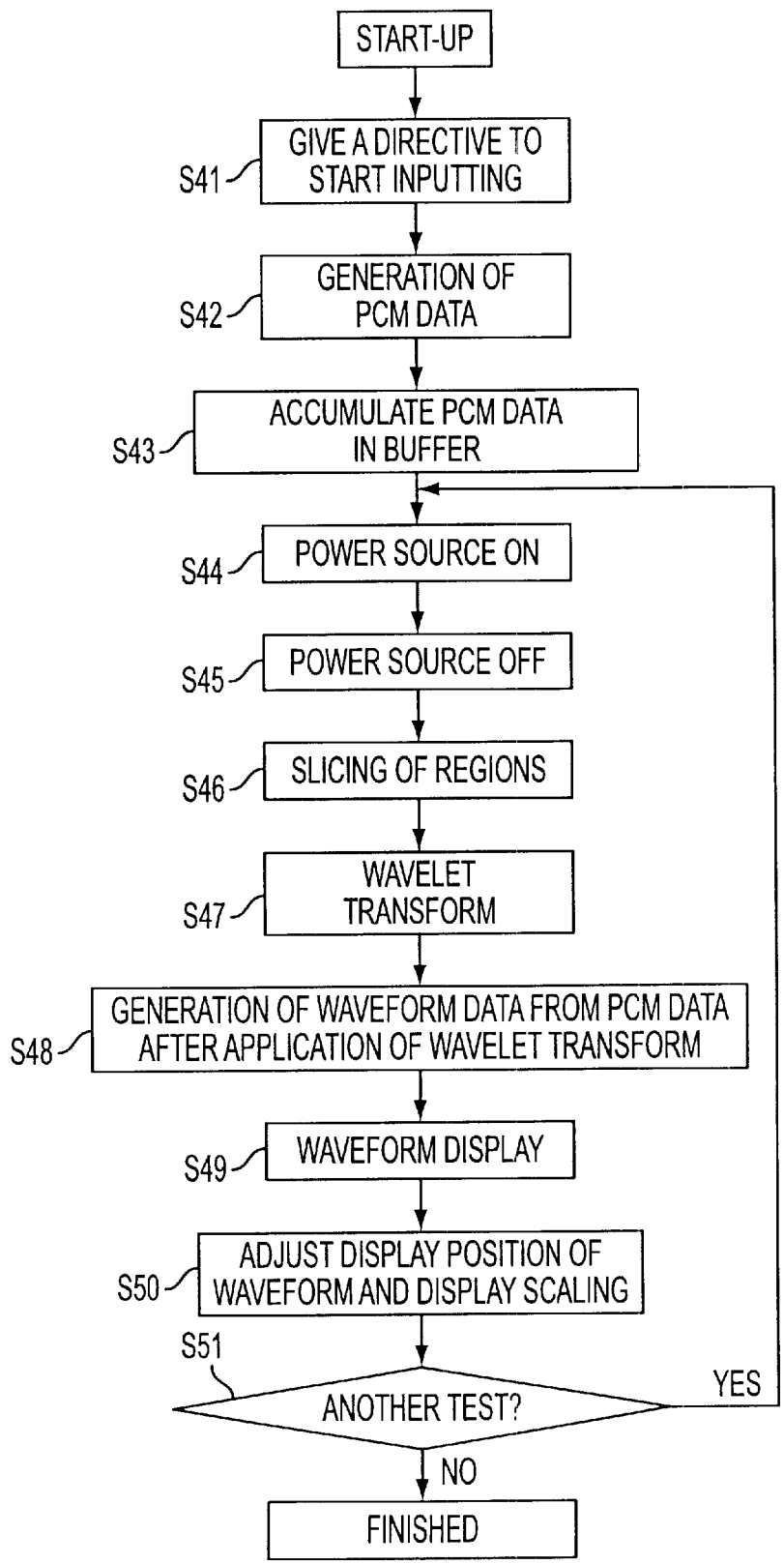
FIG. 16 is a flow chart showing operation of a fourth embodiment of the invention.

Referring to FIG. 16, operation of the fourth embodiment is described hereinafter. FIG. 16 is a flow chart showing the operation of the fourth embodiment.

The observer gives a directive to start inputting by manipulating the operation panel 207 (S41). Upon receiving the directive, the sound device 202 receives an output from the contact microphone 1, generates the PCM digital data from the output, and sends the PCM digital data to the buffer 203 (S42). In this connection, the sound device 202 is transmitting inaudible data to the buffer 203 before the hard disk 2 is started up. The buffer 203 receives the PCM digital data from the sound device 202, and accumulates the same therein (S43).

Subsequently, an observer sets the hard disk 2 in the acoustic inspection system 201 for hard disks, and turns the power source ON by manipulating the operation panel 207 (S44). This causes the hard disk 2 to start up. The observer waits for complete start-up of the hard disk 2, and upon the complete start-up, gives a directive to turns the power source for the hard disk 2 OFF by manipulating the operation panel 207, and stops rotation of the motor (not shown) (S45). Thereafter, the disk 6 of the hard disk 2 keeps rotating by inertia. During this time period, the acoustic inspection system 201 for hard disks keeps fetching data, and accumulates the data as fetched in the buffer 203. Thereafter, the disk 6 stops rotating, whereupon data will be in an inaudible condition. At this point in time, the acoustic inspection system 201 for hard disks ends the fetching of data.

Subsequently, the waveform converter 204 reads out the PCM digital data from the buffer 203, and slices a time region thereof, immediately before the disk 6 stopped rotating (S46), storing in the buffer 203 the PCM digital data in the time region sliced. Slicing will be described in detail later.

Thereafter, the wavelet transform unit 208 reads out from the buffer 203 the PCM digital data in the time region sliced by the waveform data converter 204, and generates PCM digital data by applying the wavelet transform to the former (S47). The wavelet transform unit 208 transmits the PCM digital data with the wavelet transform applied thereto to the buffer 203 so as to be accumulated therein. The waveform data converter 204 reads out the PCM digital data with the wavelet transform applied thereto from the buffer 203, and generates waveform data on the basis of such data (S48).

The display 205 receives the waveform data generated by the waveform converter 204 via the buffer 203, and displays the same (S49).

The observer manipulates the operation panel 207 so as to adjust the display position of the waveform data and the display scaling (S50). Thereupon, the observer makes a decision on whether or not a stroke mark is present on the basis of a waveform displayed by checking whether periodic steep peaks as shown in FIG. 11 appear or not.

Thereafter, the operation flow returns to the step S44 in case of inspecting another hard disk, and otherwise, inspection is finished (S51).

Figure 17:
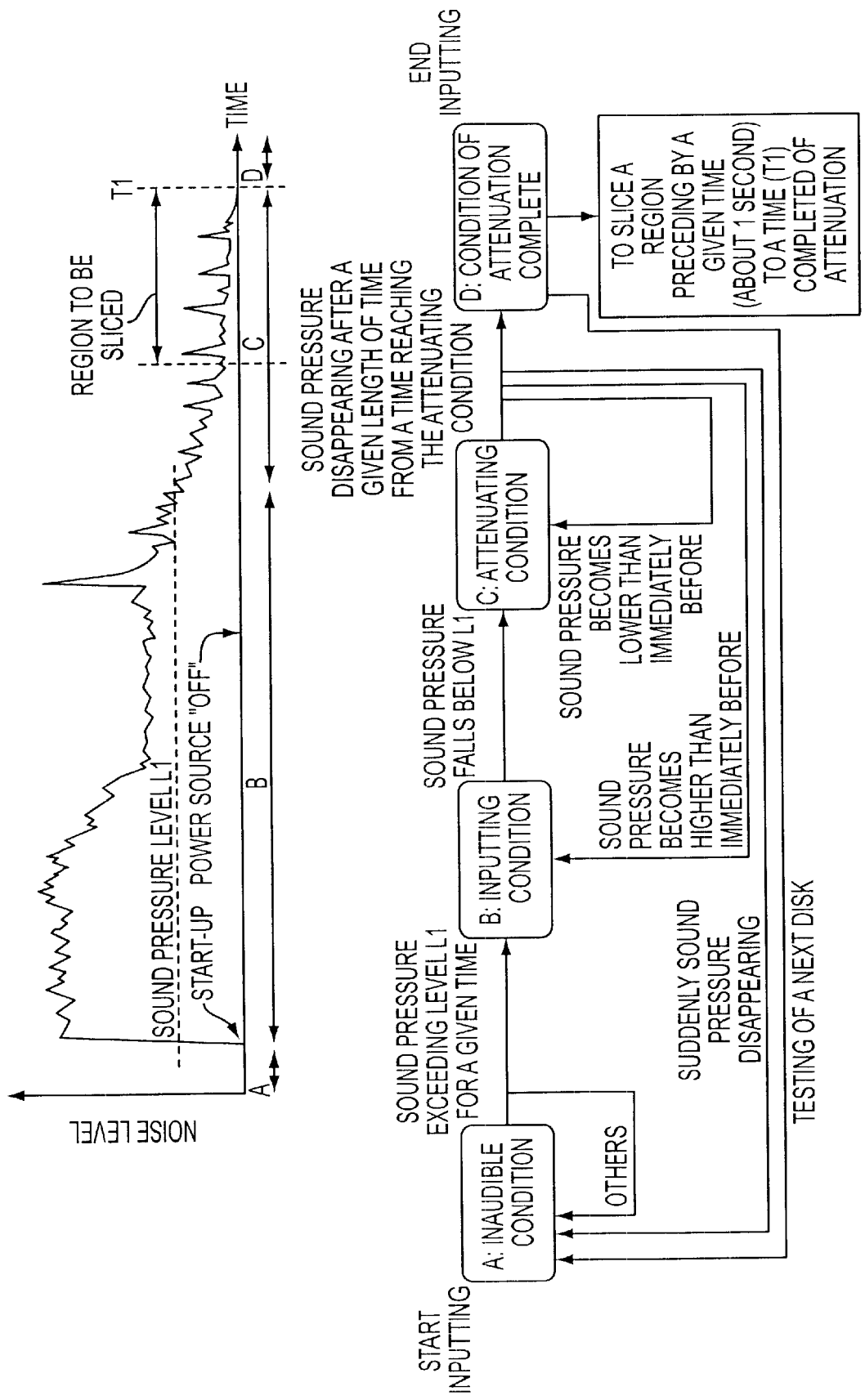
FIG. 17 is a view showing steps of slicing a time region.

Now, referring to FIG. 17, the slicing is described in detail. FIG. 17 is a view showing a step of slicing.

Upon receiving the directive predetermined by the observer to start inputting, the acoustic inspection system 201 for hard disks starts fetching data. The acoustic inspection system 201 for hard disks generates PCM digital data from the data fetched, and accumulates the PCM digital data in the buffer 203. At the same time, the acoustic inspection system 201 for hard disks causes the waveform converter 204 to calculate an average power value of noise in the PCM digital data accumulated in the buffer 203, for every predetermined time (for example, about 0.1 second) from the head of the data, thereby deciding on a condition of the data depending on the average power value.

The condition of the data shifts from A to B, from B to C, and from C to D. A represents an inaudible condition of noise, B a condition of noise which is not lower than a predetermined level L1 of sound pressure, C a condition of noise attenuating, and D a condition of noise at the completion of attenuation. The acoustic inspection system 201 for hard disks decides that the noise is in the A condition during a period of time from the start of the data fetching executed thereby to a point immediately before the data exceeds the level L1 of sound pressure for a predetermined time. Subsequently, upon the data fetched exceeding the level L1 of sound pressure for a predetermined time, the acoustic inspection system 201 for hard disks decides that the noise is in the B condition during a period of time from that point in time to a point immediately before the data falls to the level L1 of sound pressure or lower. Subsequently, upon the data fetched falling to the level L1 of sound pressure or lower, the acoustic inspection system 201 for hard disks decides that the noise is in the C condition during a period of time from the point in time where the sound pressure falls below the level L1 to a point where the sound becomes inaudible. Subsequently, upon the data fetched becoming inaudible, the acoustic inspection system 201 for hard disks decides that the noise is in the D condition. Thereafter, the acoustic inspection system 201 for hard disks ends fetching of the data after a predetermined length of time has elapsed from a point in time (T1) in time when the D condition is reached.

The acoustic inspection system 201 for hard disks then causes the waveform converter 204 to reads out data accumulated in the buffer 203, and slices a period of time starting from a point preceding by a predetermined time (about one second) the time T1 when the noise reached the D condition as a period of time during which a decision on whether or not the stroke mark 103 is present is to be made. Subsequently, the acoustic inspection system 201 for hard disks causes the wavelet transform unit 208 to execute wavelet transform of data for the period of time sliced thereby.

Thus, with the fourth embodiment, since the period of time during which the characteristic of the stroke mark 103 is exhibited intensely is sliced, not only the memory capacity necessary for processing the data can be reduced but also a processing time can be shortened. For example, with the fourth embodiment described above, the data to be processed is reduced to about 1 second in terms of processing while, with the third embodiment, the data to be processed corresponds to about 15 seconds. As a result, with the fourth embodiment, the memory capacity can be reduced to about one fifteenth of that for the third embodiment, and at the same time, processing time can be shortened to about one fifteenth of that for the third embodiment.

Fifth Embodiment

The first to fourth embodiments described hereinbefore have a constitution wherein a decision on whether or not a stroke mark is present is made by an observer. With such a constitution, however, it is possible that the observer makes an erroneous decision due to differences among individuals. With a fifth embodiment, therefore, an acoustic inspection system 201 for hard disks is made up to automatically analyze by itself to find out whether or not a stroke mark is present.

Figure 18:
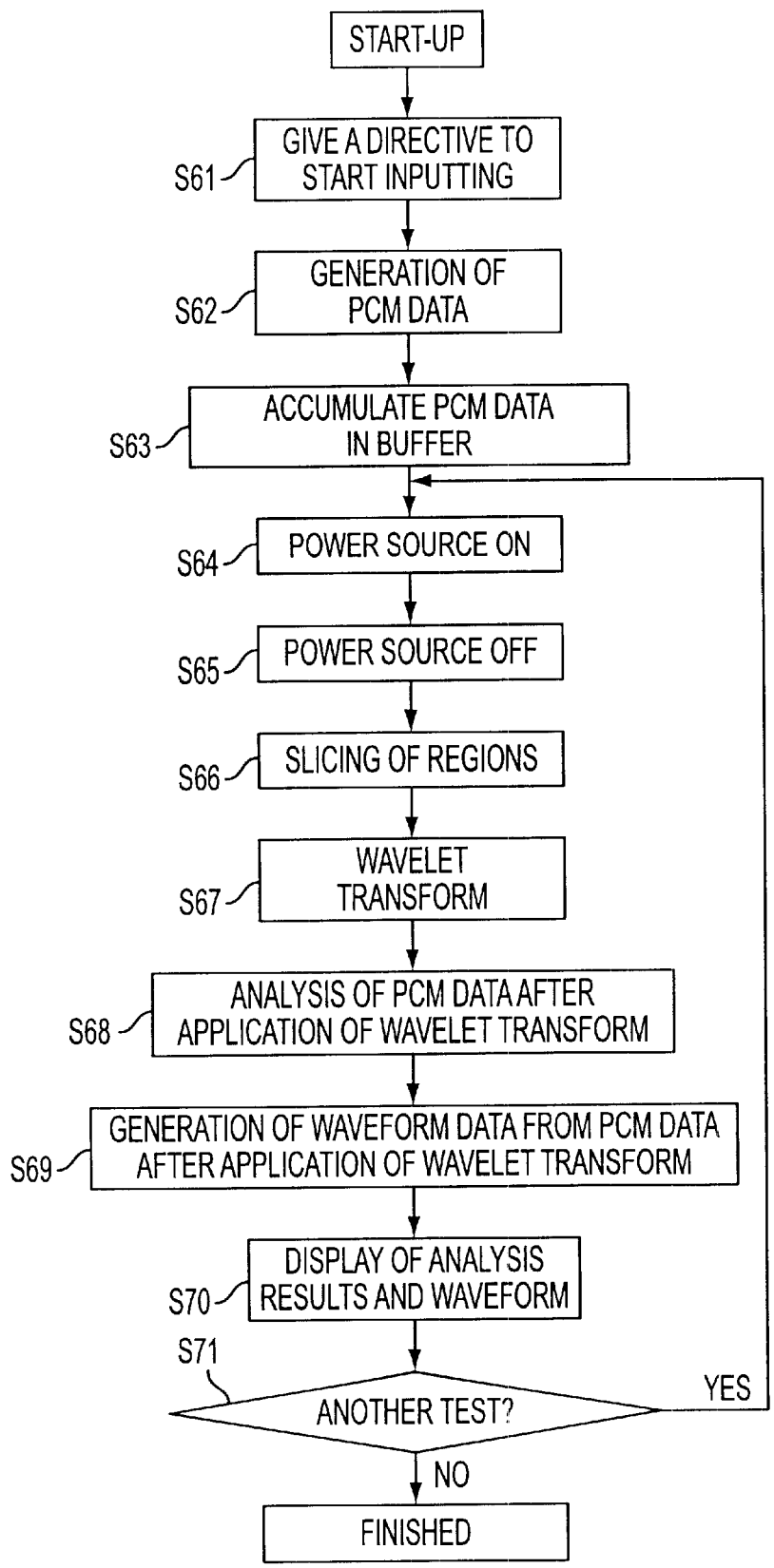
FIG. 18 is a flow chart showing operation of a fifth embodiment of the invention.

Referring to FIG. 18, operation of the fifth embodiment is described hereinafter. FIG. 18 is a flow chart showing the operation of the fifth embodiment.

An observer gives a directive to start inputting by manipulating the operation panel 207 (S61). Upon receiving the directive, the sound device 202 receives an output from the contact microphone 1, generates the PCM digital data from the output, and sends out the PCM digital data to the buffer 203 (S62). In this connection, the sound device 202 is transmitting inaudible data to the buffer 203 before the hard disk 2 is started up. The buffer 203 receives the PCM digital data from the sound device 202, and accumulates the same therein (S63).

Subsequently, the observer sets the hard disk 2 in the acoustic inspection system 201 for hard disks, and turns the power source for the hard disk 2 ON by manipulating the operation panel 207 (S64). This causes the hard disk 2 to start up. The observer waits for complete start-up of the hard disk 2, and upon the complete start-up, gives a directive to turns the power source for the hard disk 2 OFF by manipulating the operation panel 207, and stops rotation of the motor (not shown) (S65). Thereafter, the disk 6 of the hard disk 2 keeps rotating by inertia. During this period of time, the acoustic inspection system 201 for hard disks keeps fetching data, and accumulates the data fetched in the buffer 203. Thereafter, the disk 6 stops rotating, whereupon the data will be in an inaudible condition. At this point in time, the acoustic inspection system 201 for hard disks ends the fetching of data.

Subsequently, the waveform data converter 204 of the acoustic inspection system 201 for hard disks reads out the PCM digital data from the buffer 203, and slices a time region, immediately before the disk 6 stopped rotating (S66), storing in the buffer 203 the PCM digital data in the time region sliced.

Thereafter, the wavelet transform unit 208 reads out from the buffer 203 the PCM digital data in the time region sliced by the waveform data converter 204, and generates PCM digital data by applying the wavelet transform thereto (S67). The controller 206 reads out from the buffer 203 the PCM digital data with the wavelet transform applied thereto, and carries out an analysis for a stroke mark on the basis of such data (S68). An analysis to be carried out will be described in detail later.

Thereafter, the waveform data converter 204 reads out the PCM digital data with the wavelet transform applied thereto from the buffer 203, and generates waveform data on the basis of such data (S69).

The display 205 receives results of analysis on whether or not a stroke mark is present as executed by the controller 206 and the waveform data generated by the waveform data converter 204 via the buffer 204, and display both (S70), thereby enabling the observer to check whether or not a stroke mark is present.

Thereafter, the operation flow returns to the step S64 in case of inspecting another hard disk, and otherwise, an inspection is finished (S71).

Figure 19:
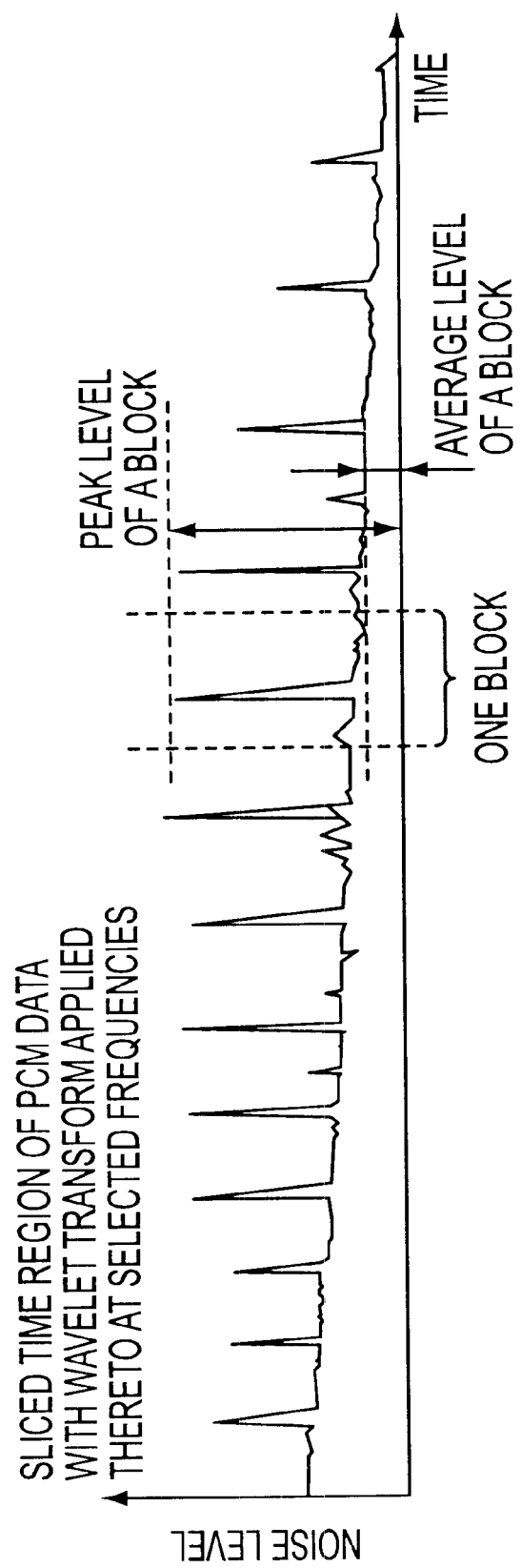
FIG. 19 is a view showing a sliced time region.
Figure 20:
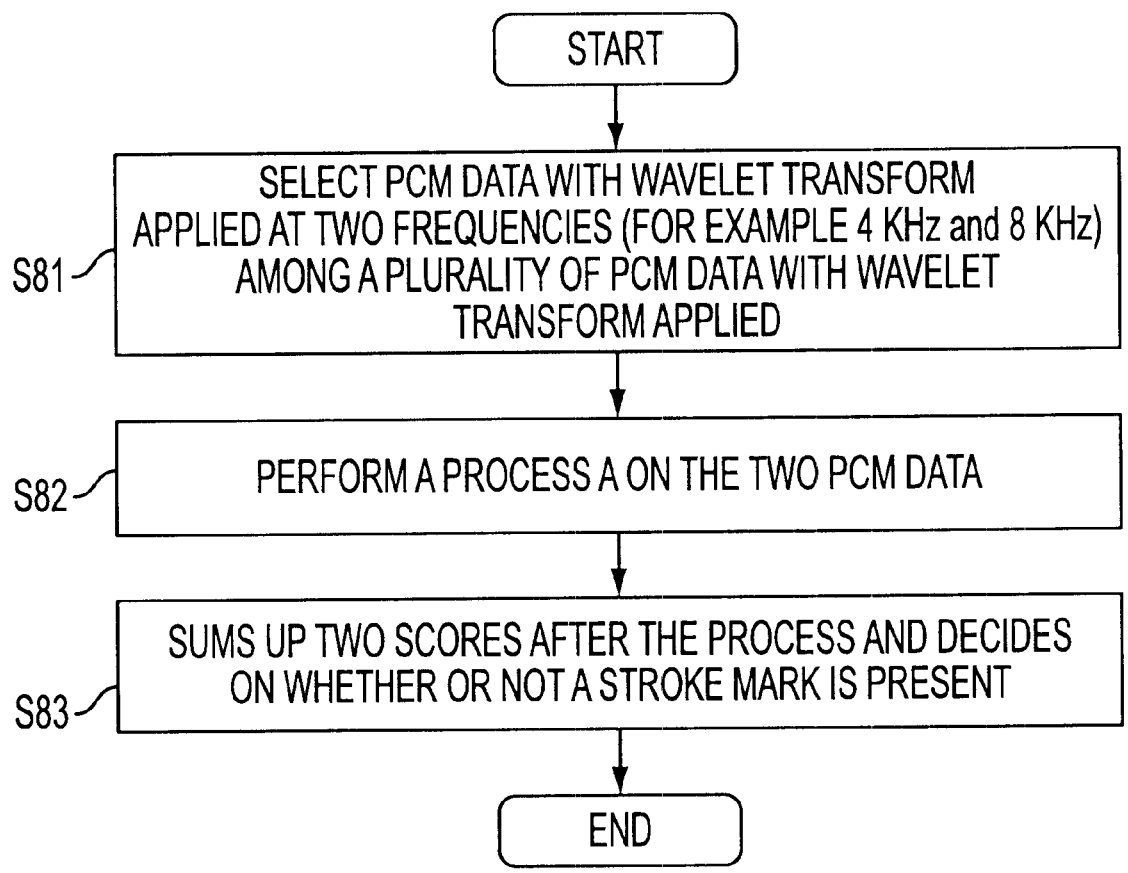
FIG. 20 is a view showing steps of an analyzing process.
Figure 21:
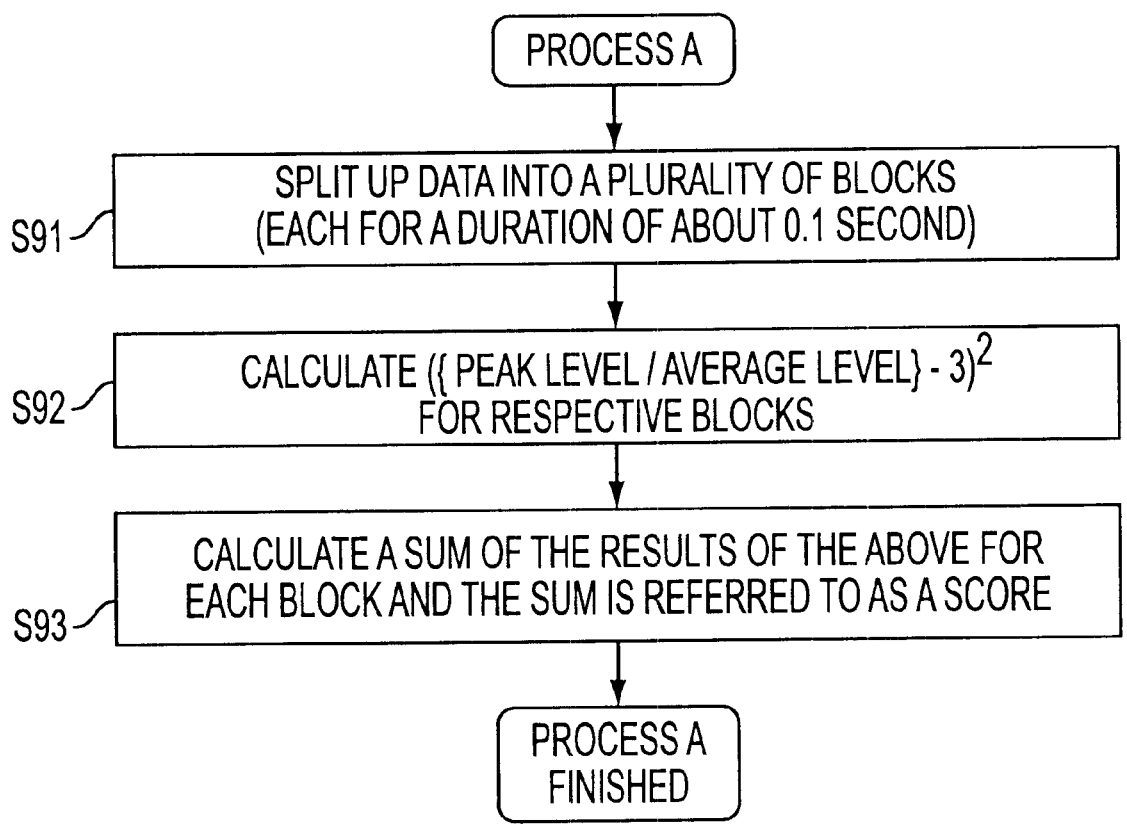
FIG. 21 is a view showing steps of a process A.

Now, referring to FIGS. 19, 20, and 21, the analysis to be carried out is described in detail hereinafter. FIG. 19 is a view showing a time region sliced according to the fourth embodiment, FIG. 20 a view showing steps of an analyzing process, and FIG. 21 a view showing steps of a process A.

The controller 206 selects two frequencies such as, for example, 4 KHz and 8 KHz, and reads out from the buffer 203 PCM data at these frequencies with the wavelet transform applied thereto (S81). Subsequently, the controller 206 performs the process A as shown in FIG. 21 (S82)

Specifically, the controller 206 split up the PCM data at two frequencies into a plurality of blocks, each for a duration of about 0.1 second (S91). Thereafter, the controller 206 executes an arbitrary calculation with respect to each of the blocks. Use of a formula, for example, ({peak level/average level} −3) is suitable for such an arbitrary calculation. This is so because there is a high possibility that an intense noise such that the peak level thereof within a block exceeds three times the average level thereof within the block is caused by the stroke mark 103. However, with the fifth embodiment, the square of the result of the formula ({peak level/average level} −3) is to be used for respective blocks to enable the peak level in respective blocks to be distinguished conspicuously (S92). Subsequently, the controller 206 calculates a sum of the results of the arbitrary calculation in the respective blocks (S93). Thus, the process A is completed. The sum calculated in the step S93 is referred to as a score hereinafter.

Thereafter, the controller 206 calculates a sum of the respective scores at the two frequencies, and decides on whether or not the stroke mark 103 is present on the basis of a value of the sum (S83). That is, the controller 206 decides that the stroke mark 103 is present if the value of the sum is greater than a predetermined value, and that the stroke mark 103 is not present if the value of the sum is smaller than a predetermined value. Further, the fifth embodiment may be made up such that a decision on whether or not the stroke mark 103 is present can be made based on a correlation between the value of the sum and the waveform in addition to the decision based on the value of the sum.

Thus, with the fifth embodiment, since the acoustic inspection system 201 for hard disks itself is made up to analyze automatically to find out whether or not a stroke mark is present, it is possible to eliminate a possibility of the observer making an erroneous decision due to differences among individuals. Furthermore, it is no longer required in this case to display the waveform, so that the display 205 can be dispensed with. In such a case, it is possible to provide an acoustic inspection system for hard disks, small in size and light in weight, at a low cost.

Sixth Embodiment

With the fifth embodiment described above, there is a possibility that once, for example, the contact microphone makes a move within the time region sliced, this will prevent a decision on whether or not the stroke mark 103 is present from being made. Accordingly, with the sixth embodiment, an analysis is executed by use of a technique different from that for the fifth embodiment, thereby enabling a correct decision to be made even in such a case.

Figure 22:
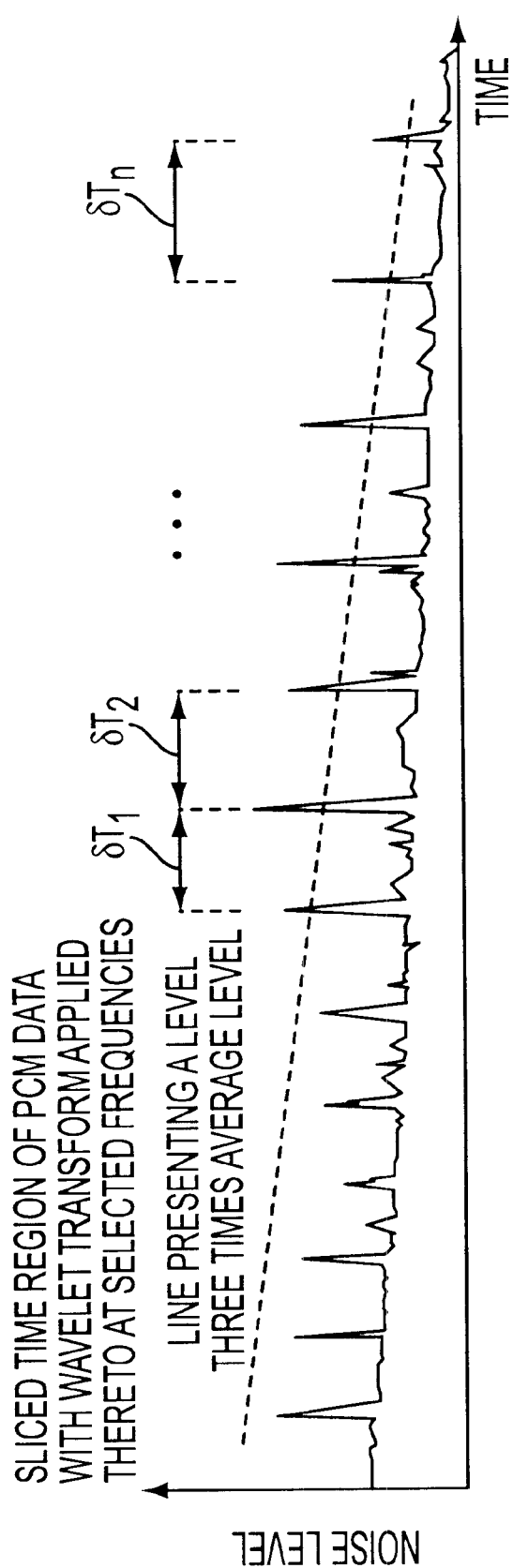
FIG. 22 is a view showing the sliced time region.
Figure 23:
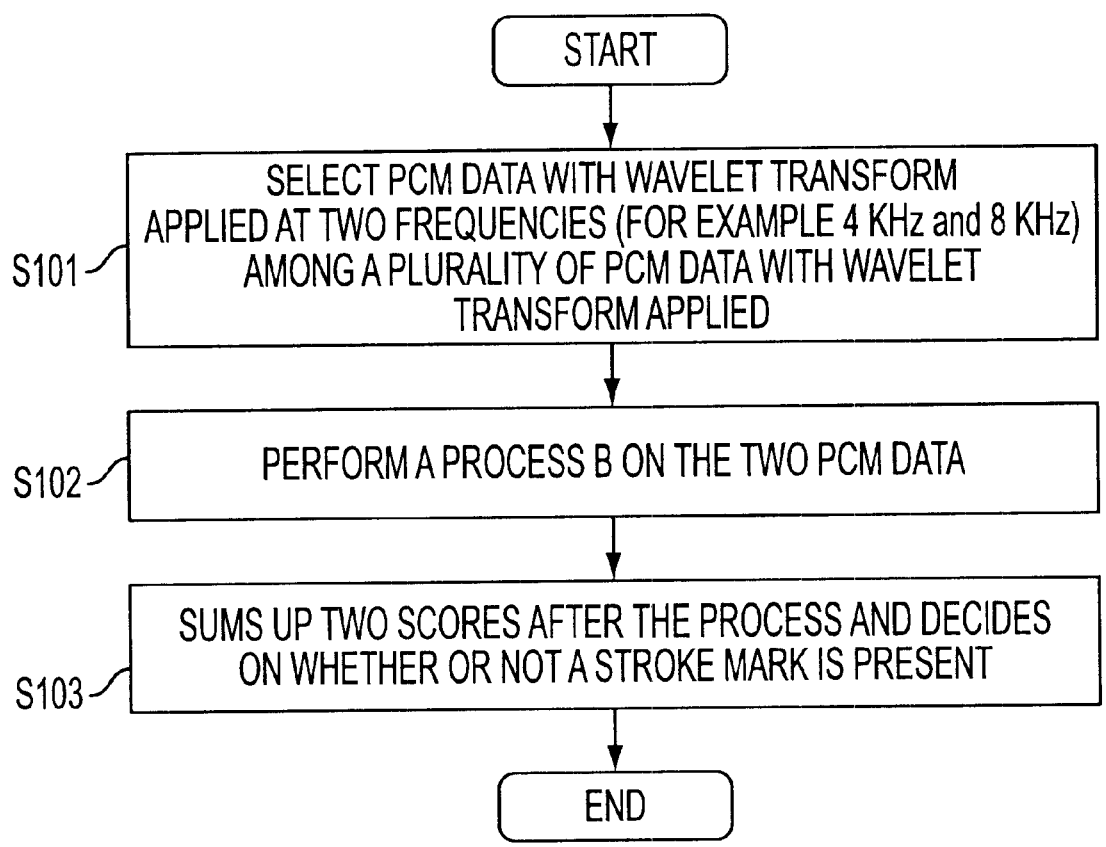
FIG. 23 is a view showing steps of an analyzing process.
Figure 24:
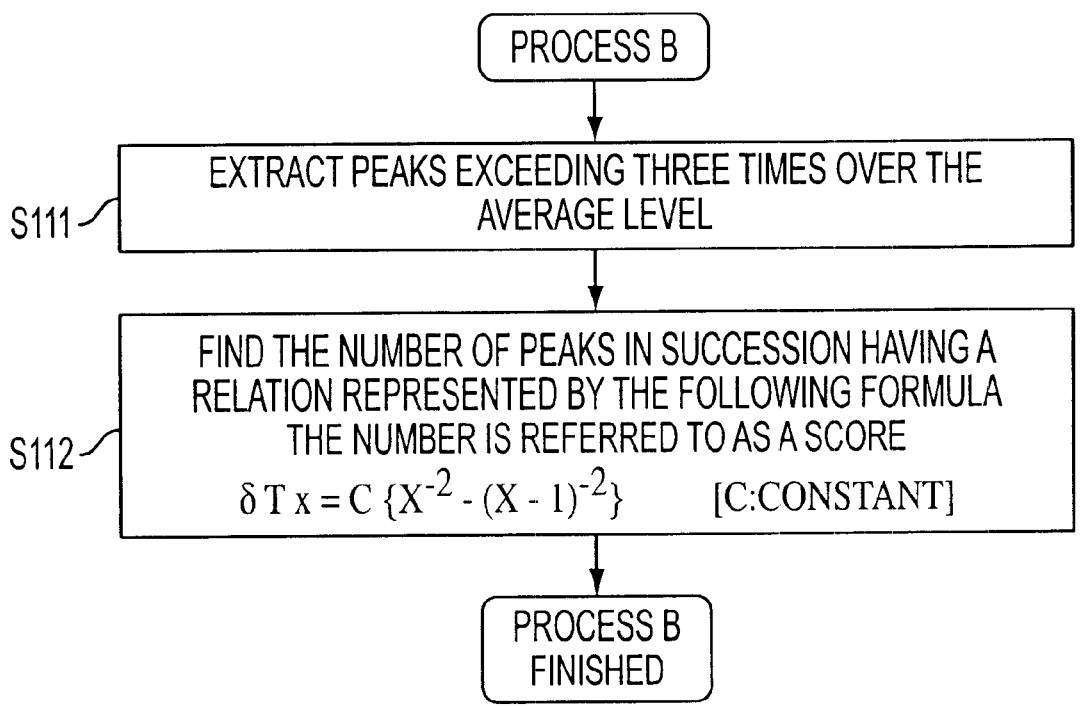
FIG. 24 is a view showing steps of a process B.

Referring to FIGS. 22, 23, and 24, the sixth embodiment is described hereinafter. FIG. 22 is a view showing the sliced time region according to the fourth embodiment, FIG. 23 a view showing steps of an analyzing process, and FIG. 24 a view showing steps of a process B.

The controller 206 selects two frequencies such as, for example 4 KHz and 8 KHz, and reads out from the buffer 203 PCM data at these frequencies with the wavelet transform applied thereto (S101). Subsequently, the controller 206 performs the process B as shown in FIG. 24 (S102).

More specifically, the controller 206 works out a line representing three times over the average level of the above-mentioned PCM data at the two frequencies, as shown in FIG. 22, and extracts noise peaks exceeding the line (S111). Subsequently, the controller 206 calculates the number (hereinafter referred to as a score) of the noise peaks, having a relation represented by the following formula;

$$\delta Tx = f(C \{D-E\})$$

where $\delta Tx$ is a time between optional adjacent peaks, C is a predetermined constant, D is $X^{-2}$, and E is $(X-1)^{-2}$.

Since the noise peaks due to the presence of the stroke mark 103 appear periodically following rotation of the disk 6, and reduction in rotation speed thereof occurs due to effects of bearings and air resistance, the time between respective peaks is represented by the above formula, $\delta Tx = f(C \{D-E\})$. Accordingly, by quantifying how many of the peaks represented by the above formula appear in succession, it becomes possible to make a decision on whether or not the stroke mark 103 is present.

The process B is finished as described above.

Thereafter, the controller 206 calculates a sum of the respective scores at the two frequencies, and decides on whether or not the stroke mark 103 is present on the basis of a value of the sum (S103). That is, the controller 206 decides that the stroke mark 103 is present if the value of the sum is greater than a predetermined value, and that the stroke mark 103 is not present if the value of the sum is smaller than a predetermined value. Further, the sixth embodiment may be made up such that a decision on whether or not the stroke mark 103 is present can be made based on a correlation between the value of the sum and the waveform in addition to the decision based on the value of the sum.

As described above, with the sixth embodiment, calculation is performed by use of periodicity of peak levels appearing due to the stroke mark 103, and the deceleration characteristic of the spindle of the hard disk 2, thereby enabling a decision on whether or not the stroke mark 103 is present to be made more accurately than by the method according to the fifth embodiment.

Seventh Embodiment

In terms of constituting materials for respective components, and construction, the hard disks 2 differ from one another, depending on a type thereof. Consequently, different types of the hard disks 2 differ from each other in respect of intensity of a noise caused by the spindle, a manner in which rotation of a disk attenuates, tone color of a noise caused by the stroke mark 103, and so forth. Accordingly, with the seventh embodiment, the acoustic inspection system 201 for hard disks holds parameters that varies depending on a type of a hard disk, such as intensity of the noise caused by the spindle thereof, the manner in which rotation of a disk attenuates, tone color of a noise caused by the stroke mark 103, etc., and is enabled to analyze data using the parameters dependent on the type of hard disk. As a result, with the seventh embodiment, a decision on whether or not the stroke mark 103 is present can be made against a plurality of hard disks.

Figure 25:
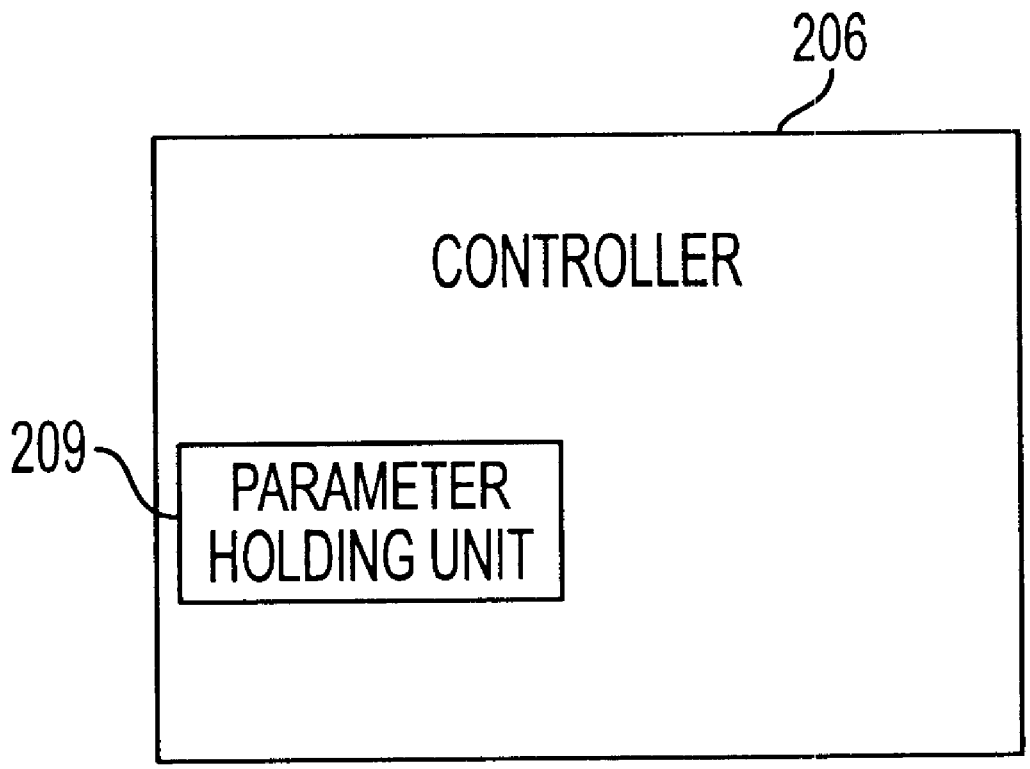
FIG. 25 is a view showing a constitution of a controller of an acoustic inspection system for hard disks according to a seventh embodiment.

Referring to FIG. 25, the seventh embodiment is described hereinafter. FIG. 25 is a view showing a constitution of a controller of an acoustic inspection system for hard disks according to the seventh embodiment.

With the seventh embodiment, as shown in the figure, the controller 206 comprises a parameter holding unit 209 for holding the parameters for use in analysis, dependent on the type of hard disk. The parameters held by the parameter holding unit 209 include, for example, intensity of the noise caused by the spindle of respective types of hard disks, manner in which rotation of a disk attenuates, tone color of noise caused by the stroke mark 103, the location as well as the scope of time regions sliced, counts used in operations, weighting of operation results, reference values used in making decisions, and so forth.

With the seventh embodiment, steps of operation are substantially the same as those of the embodiment, shown in FIG. 18, except that, in the step S61, an observer is to designate a type of the hard disk 2. This will enable the controller 206 to cause respective components to operate on the basis of the parameters held by the parameter holding unit 209.

Thus, with the seventh embodiment, the decision corresponding to the type of the hard disk 2 can be made, so that precision of the analysis can be enhanced.

Eighth Embodiment

In the case of the first to the seventh embodiments, the acoustic inspection system 201 for hard disks is made up such that an inspection is conducted by an observer is in attendance at the system. With such a constitution, if, for example, a large number of the hard disk 2 are inspected at a factory, a written inspection record needs to be made every time the observer conducts inspection of a hard disk 2. Such a procedure, however, will force much labor upon the observer. Accordingly, an acoustic inspection system 201 for hard disks according to an eighth embodiment is provided so as to be able to store data on the hard disks 2 inspected thereby, so that an observer can outputs the data at his option. As a result, with the eighth embodiment, a large number of hard disks 2 can be inspected without imposing much labor upon the observer.

Figure 26:
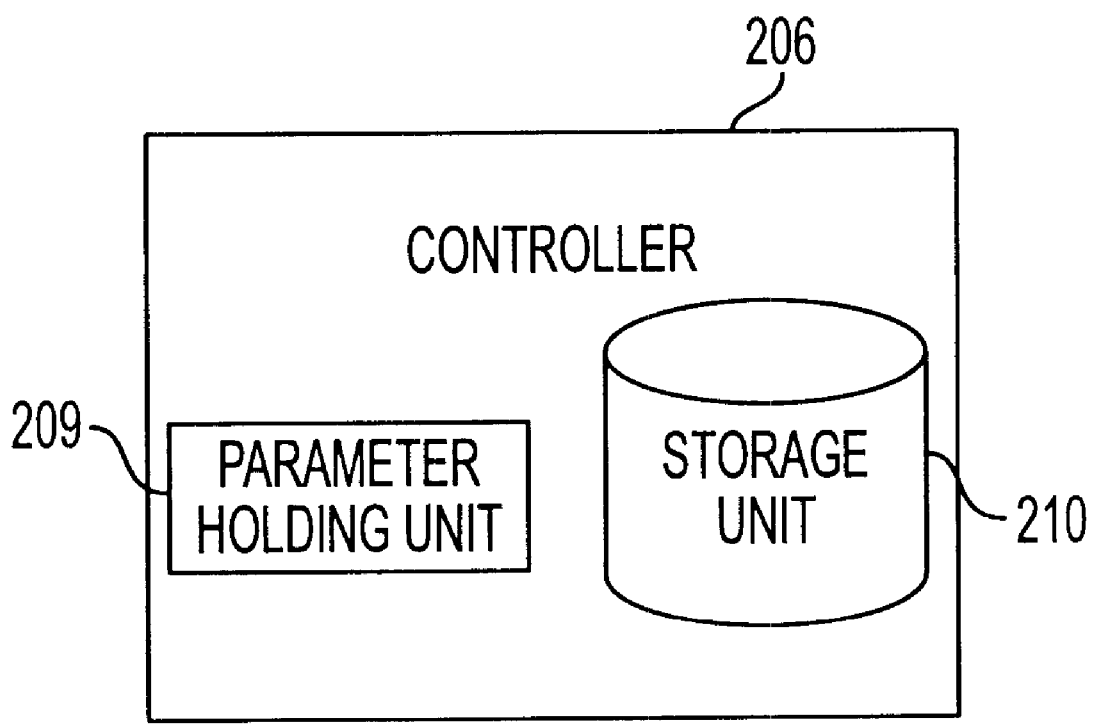
FIG. 26 is a view showing a constitution of a controller of an acoustic inspection system for hard disks according to an eighth embodiment.
Figure 28:
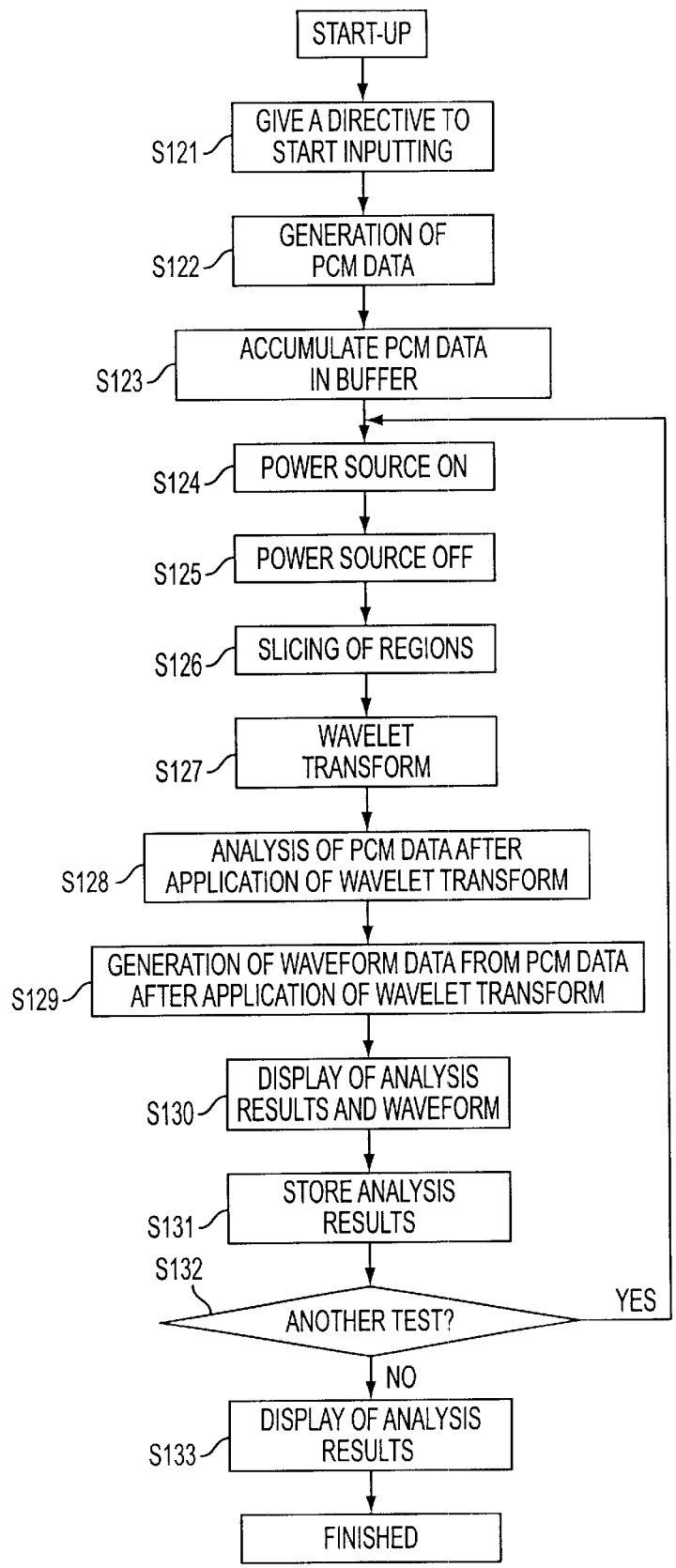
FIG. 28 a flow chart showing operation of the eighth embodiment.

Referring to FIGS. 26, 27, and 28, the eighth embodiment is described hereinafter. FIG. 26 is a view showing a constitution of a controller of an acoustic inspection system for hard disks according to the eighth embodiment, FIG. 27 a view showing an example of data stored in a storage unit, and FIG. 28 a flow chart showing the operation of the eighth embodiment.

As shown in FIG. 26, with the eighth embodiment, the controller 206 is provided with a storage unit 210 in addition to the parameter holding unit 209 described above.

Steps of the operation of the eighth embodiment are described hereinafter.

Referring to FIG. 28, an observer gives a directive to start inputting by manipulating the operation panel 207 (S121). Upon receiving the directive, the sound device 202 receives an output from the contact microphone 1, generates the PCM digital data from the output, and sends out the PCM digital data to the buffer 203 (S122). At this point in time, the sound device 202 is transmitting inaudible data to the buffer 203 before the hard disk 2 is started. The buffer 203 receives the PCM digital data from the sound device 202, and accumulates the same therein (S123).

Subsequently, the observer sets the hard disk 2 in the acoustic inspection system 201 for hard disks, and turns the power source for the hard disk 2 ON by manipulating the operation panel 207 (S124). This causes the hard disk 2 to start up. The observer waits for complete start-up of the hard disk 2, and upon the complete start-up, gives a directive to turns the power source for the hard disk 2 OFF by manipulating the operation panel 207, and stops rotation of the motor (not shown) (S125). Thereafter, the disk 6 of the hard disk 2 keeps rotating by inertia. During this period of time, the acoustic inspection system 201 for hard disks keeps fetching data, and accumulates the data thus fetched in the buffer 203. Thereafter, the disk 6 stops rotating, whereupon the data will be in an inaudible condition. At this point in time, the acoustic inspection system 201 for hard disks ends fetching of data.

Subsequently, the waveform data converter 204 of the acoustic inspection system 201 for hard disks reads out the PCM digital data from the buffer 203, and slices a time region thereof, immediately before the disk 6 stopped rotating (S126), storing in the buffer 203 the PCM digital data in the time region sliced.

Thereafter, the wavelet transform unit 208 reads out from the buffer 203 the PCM digital data in the time region sliced by the waveform data converter 204, and generates PCM digital data by applying the wavelet transform to the former (S127). The wavelet transform unit 208 transmits the PCM digital data with the wavelet transform applied thereto to the buffer 203, and causes the buffer 203 to store the same. The controller 206 reads out from the buffer 203 the PCM digital data with the wavelet transform applied thereto, and analyzes whether or not a stroke mark is present on basis of such data (S128). An analysis to be conducted will be described in detail later.

Thereafter, the waveform data converter 204 reads out the PCM digital data with the wavelet transform applied thereto from the buffer 203, and generates waveform data on the basis of such data (S129).

The display 205 receives results of analysis on whether or not a stroke mark is present as executed by the controller 206 and also the waveform data generated by the waveform data converter 204 via the buffer 203, and display both (S130). The observer may check whether or not a stroke mark is present at this point in time, or may ignore the both, and check whether or not a stroke mark is present in a step (S133) as described hereinafter.

The controller 206 causes the storage unit 210 to store therein the data on the hard disk 2 inspected (S131). A combination of type numbers of hard disks 2, results of analyses, the scores, and so forth that are arranged so as to correspond to the order of inspections (inspection no.), as shown in FIG. 27, will be suitable as a form of data to be stored in the storage unit 210.

Thereafter, an operation flow returns to the step S124 in case of inspecting another hard disk (S132). Otherwise, the observer manipulates the operation panel 207, and causes the controller 206 to display on the display 205 the data stored in the storage unit 210, or to output the same to a document printer (not shown) or other terminals (not shown) (S133). This enables the observer to decide on whether or not a stroke mark is present. Further, the controller 206 of the acoustic inspection system 201 for hard disks can be provided with an additional function of processing the data. In such a case, the observer can process the data into an optional form. A form in which the above-mentioned items are listed in the order of the inspections is suitable for the purpose.

Thus, the operation is finished.

As described in the foregoing, with the eighth embodiment, the acoustic inspection system 201 for hard disks is made up so as to store the data on the hard disk inspected thereby, thereby enabling the observer to output the data at his option. Hence, it has become possible for the observer to test a large number of hard disks 2 without much effort forced on him.

Ninth Embodiment

With a ninth embodiment, a storage unit 210 is caused to store acoustic data in an original sound condition at an inspection (that is, PCM data prior to the wavelet transform applied thereto), enabling an observer to check later on the acoustic data in the original sound condition at the test.

Figure 29:
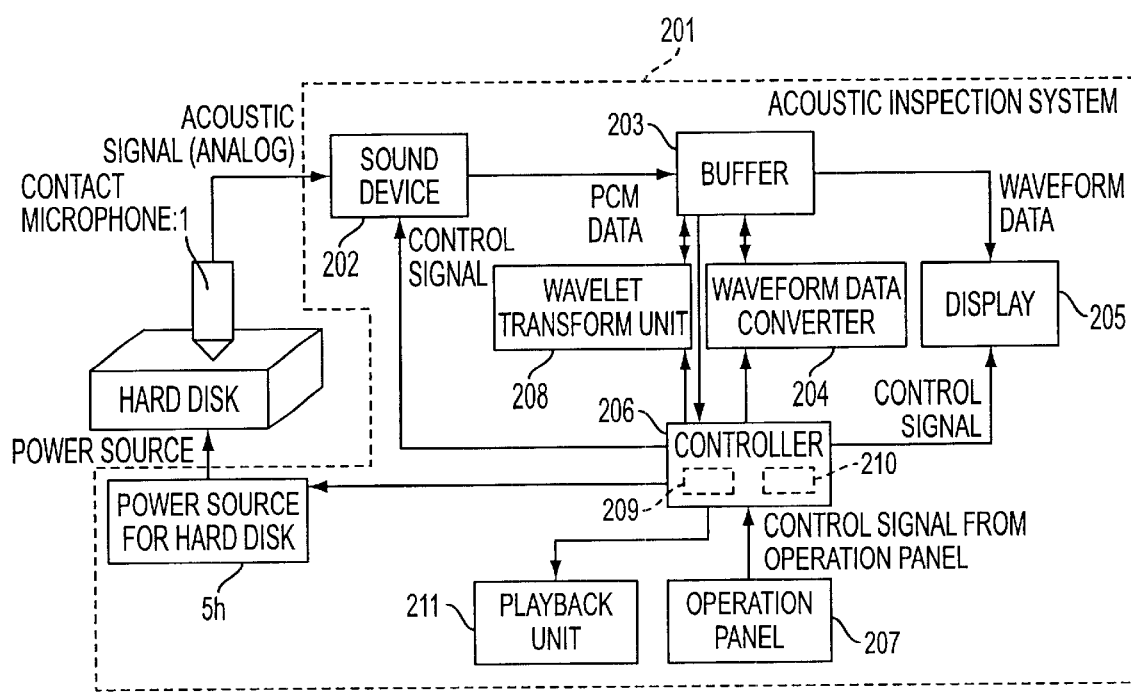
FIG. 29 is a view showing a constitution of a ninth embodiment of the invention.
Figure 31:
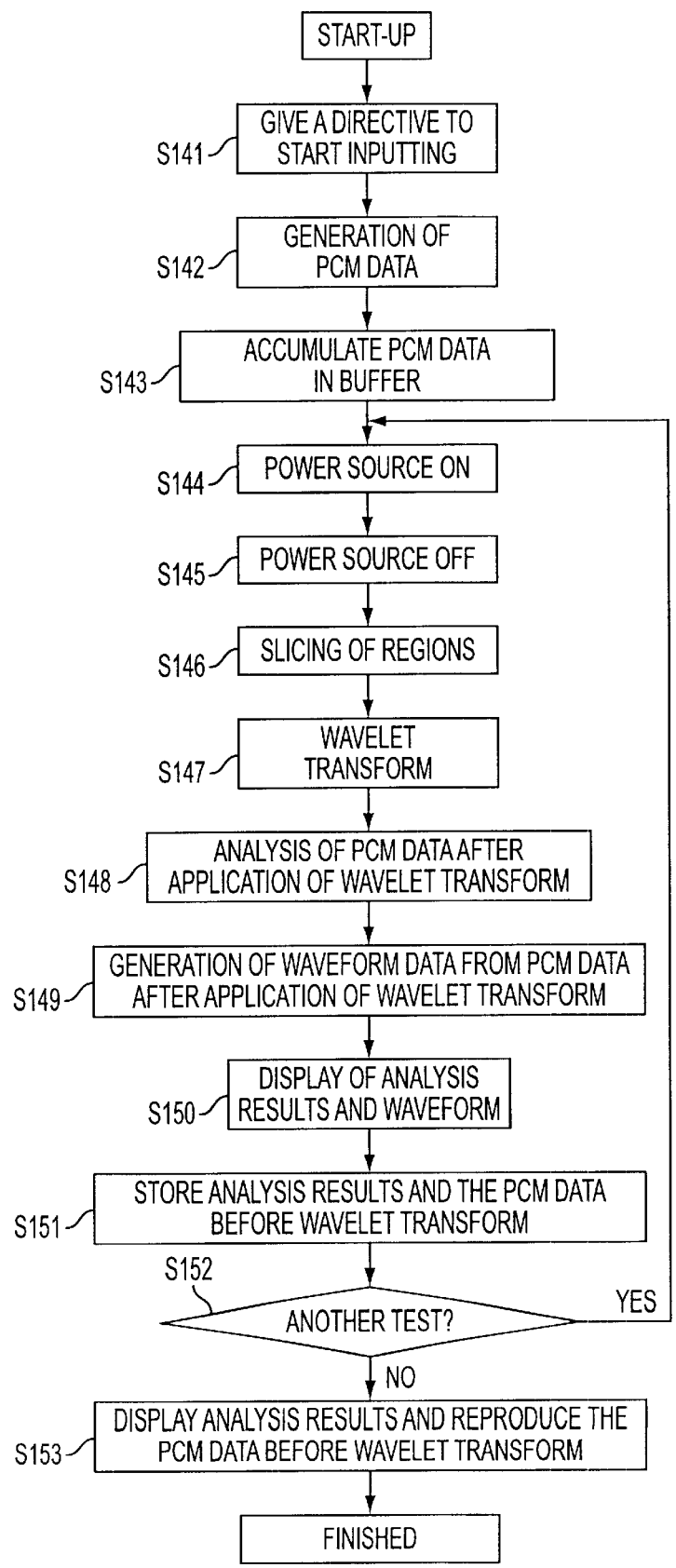
FIG. 31 is a flow chart showing operation of the ninth embodiment.

Referring to FIGS. 29, 30, and 31, the ninth embodiment is described hereinafter. FIG. 29 is a view showing a constitution of the ninth embodiment, FIG. 30 a view showing an example of data stored in a storage unit, and FIG. 31 a flow chart showing operation of the ninth embodiment.

As shown in FIG. 29, with the ninth embodiment, a playback unit 211 is provided.

The operation of the ninth embodiment is described hereinafter.

An observer gives a directive to start inputting by manipulating the operation panel 207 (S141). Upon receiving the directive, the sound device 202 receives an output from the contact microphone 1, generates the PCM digital data from the output, and transmits the PCM digital data to the buffer 203 (S142). At this point in time, the sound device 202 is transmitting inaudible data to the buffer 203 before the hard disk 2 is started up. The buffer 203 receives the PCM digital data from the sound device 202, and accumulates the same therein (S143).

Subsequently, the observer sets the hard disk 2 in the acoustic inspection system 201 for hard disks, and turns the power source for the hard disk 2 ON by manipulating the operation panel 207 (S144). This causes the hard disk 2 to start up. The observer waits for complete start-up of the hard disk 2, and upon the complete start-up, gives a directive to turns the power source for the hard disk 2 OFF by manipulating the operation panel 207, and stops rotation of the motor (not shown) (S145). Thereafter, the disk 6 of the hard disk 2 keeps rotating by inertia. During this period of time, the acoustic inspection system 201 for hard disks keeps fetching data, and accumulates the data fetched in the buffer 203. Thereafter, the disk 6 stops rotating, whereupon the data will be in an inaudible condition. At this point in time, the acoustic inspection system 201 for hard disks ends fetching data.

Subsequently, the waveform data converter 204 of the acoustic inspection system 201 for hard disks reads out the PCM digital data from the buffer 203, and slices a time region thereof, immediately before the disk 6 stopped rotating (S146), storing in the buffer 203 the PCM digital data in the time region sliced.

Thereafter, the wavelet transform unit 208 reads out from the buffer 203 PCM digital data in the time region sliced by the waveform data converter 204, and generates PCM digital data by applying the wavelet transform to the former (S147). The wavelet transform unit 208 transmits the PCM digital data with the wavelet transform applied thereto to the buffer 203, and causes the buffer 203 to store the same. The controller 206 reads out from the buffer 203 the PCM digital data with the wavelet transform applied thereto, and analyses whether or not a stroke mark is present on the basis of such data (S148). An analysis to be conducted will be described in detail later.

Thereafter, the waveform data converter 204 reads out the PCM digital data with the wavelet transform applied thereto from the buffer 203, and generates waveform data on the basis of such data (S149).

The display 205 receives results of analysis on whether or not a stroke mark is present as executed by the controller 206 and also the waveform data generated by the waveform data converter 204 via the buffer 203, and displayboth (S150). The observer may check whether or not a stroke mark is present at this point in time, or may ignore both, and check whether or not a stroke mark is present in a step (S133) as described hereinafter.

The controller 206 causes the storage unit 210 to store therein the data on the hard disk 2 inspected (for example, a combination of test numbers, type numbers of the hard disks 2, results of the analysis, the scores, and so forth, as shown in FIG. 30) and the acoustic data (the PCM data prior to the wavelet transform applied thereto) (S151).

Thereafter, an operation flow returns to the step S144 in case of inspecting another hard disk (S152). Otherwise, the observer manipulates the operation panel 207, and causes the controller 206 to display on the display 205 the data stored in the storage unit 210, or to output the same to a document printer (not shown) or other terminals (not shown) while causing the playback unit 211 to reproduce the acoustic data (the PCM data prior to the wavelet transform applied thereto) stored in the storage unit 210 (S153). This enables the observer to decide on whether or not a stroke mark is present.

Thus, the operation is finished.

As described above, with the ninth embodiment, since the observer is able to check later on the acoustic data in the original sound condition at the inspections, precision with which the decision is made can be enhanced.

Tenth Embodiment

In the case of the first to ninth embodiments, the contact microphone 1 is used for detection of vibration caused by the stroke mark 103. However, the contact microphone 1 is expensive. Furthermore, there are cases where the contact microphone 1 follows vibration of the hard disk 2. In such a case, it will become impossible to acquire accurate acoustic data, and consequently, careful handling will be required. Thereupon, the invention provides a tenth embodiment which is available at a low cost and does not require careful handling.

With the tenth embodiment, in place of the contact microphone 1, an optical head which is in widespread use and available at a low cost is adopted for pickup means. In particular, with the tenth embodiment, the optical head is installed in the hard disk 2 through the intermediary of a hard rubber capable of absorbing vibration of the hard disk 2, in the acoustic frequency band (not higher than about 10 kHz). As a result, with an acoustic inspection system for hard disks according to the tenth embodiment, the optical head is able to catch vibration of the hard disk 2 while the vibration of the hard disk 2 is being absorbed by the hard rubber, so that acoustic data on the hard disk 2 can be acquired without allowing the optical head to follow the vibration- of the hard disk 2. Consequently, with the tenth embodiment, accurate acoustic data can be acquired.

Figure 32:
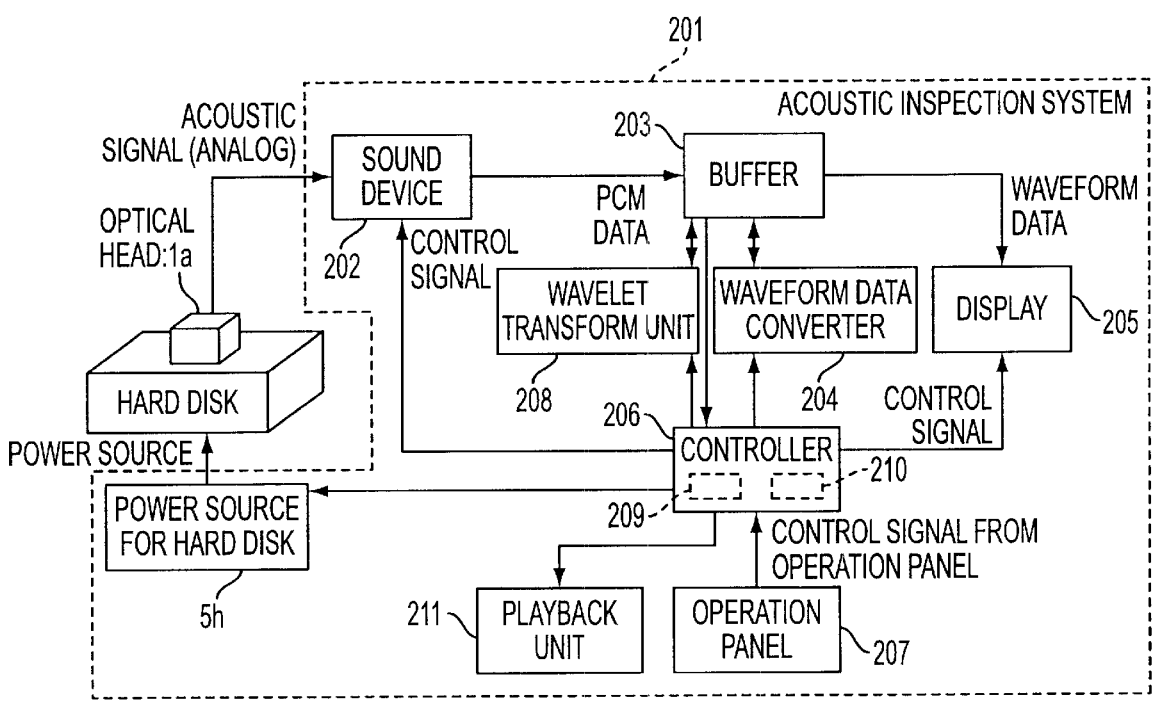
FIG. 32 is a view showing a constitution of the tenth embodiment.
Figure 33A:
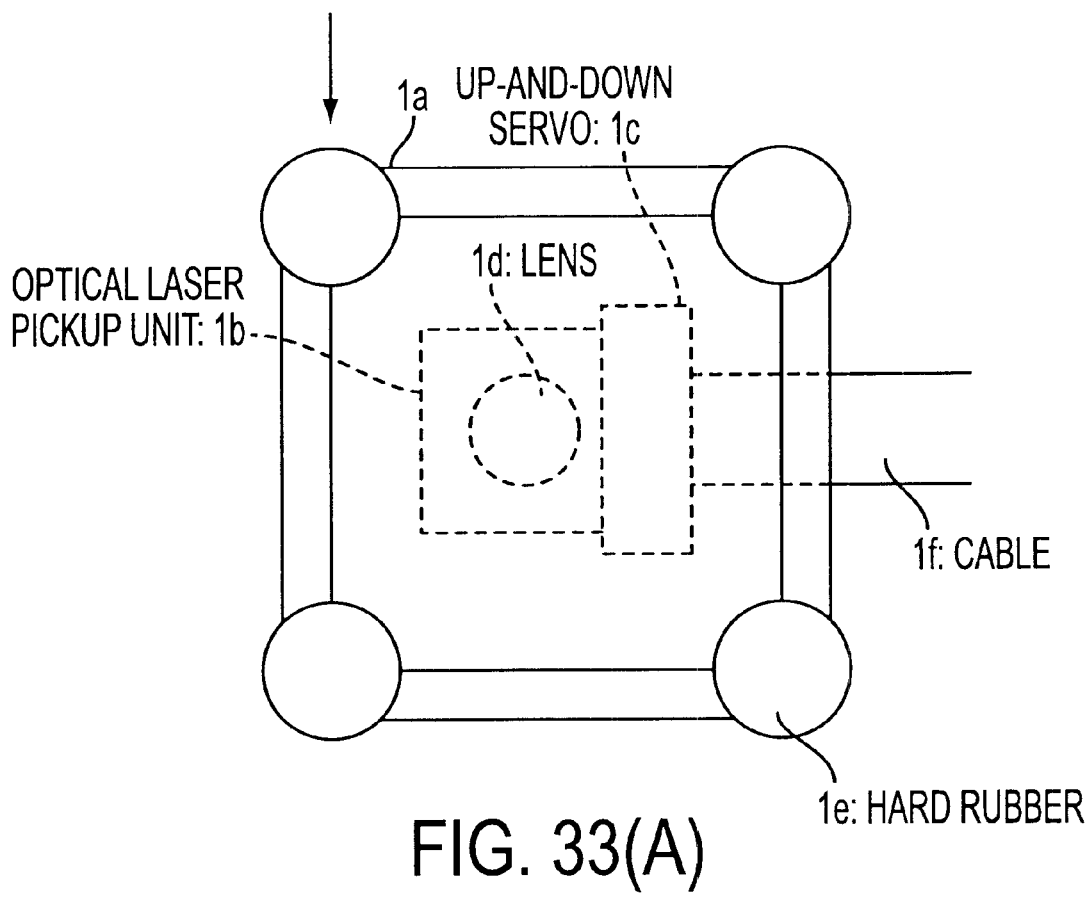
FIGS. 33(A) and 33(B) are view showing a construction of an optical head.
Figure 33B:
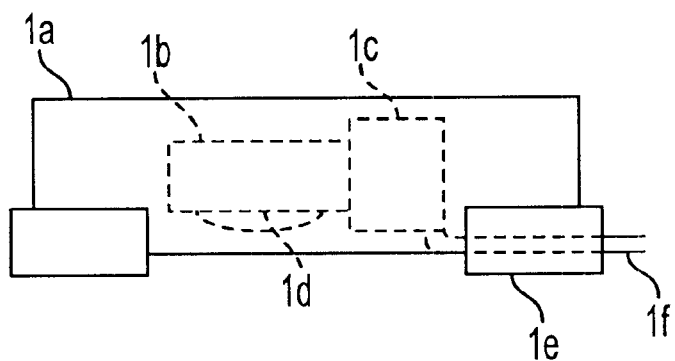
Figure 34:
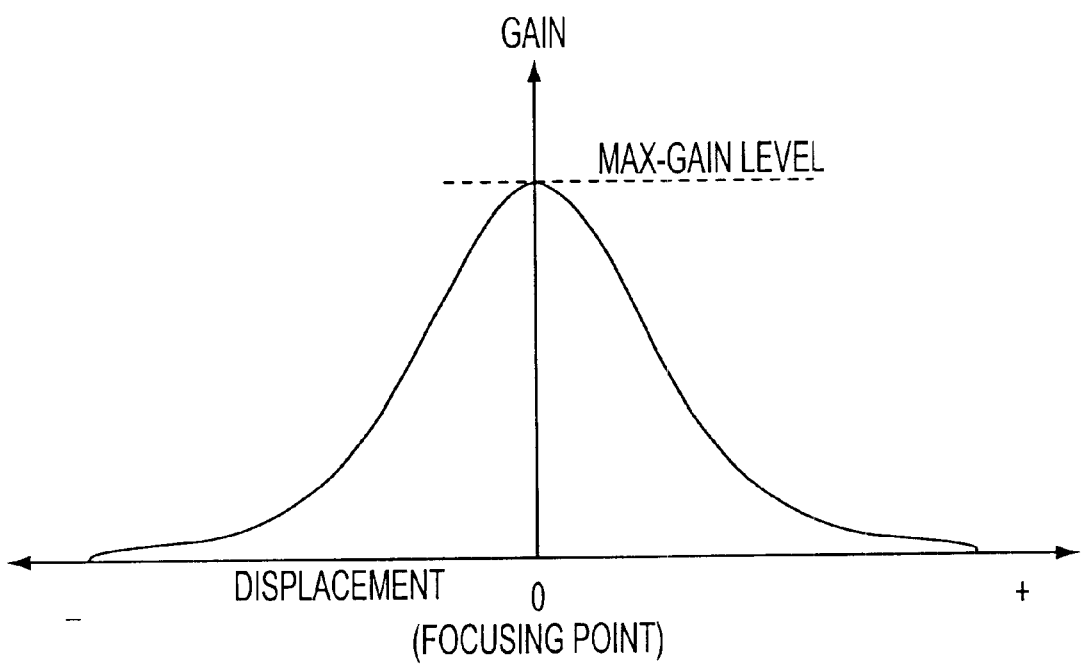
FIG. 34 is a graph showing the gain characteristic of the optical head.

Referring to FIGS. 32, 33, and 34, the tenth embodiment is described hereinafter. FIG. 32 is a view showing a constitution of the tenth embodiment, FIGS. 33(A) and 33(B) are views showing a construction of the optical head, and FIG. 34 a graph showing a gain characteristic of the optical head.

As shown in FIG. 32, with the tenth embodiment, the optical head 1a in place of the contact microphone 1 is attached to the hard disk 2 in order to detect the vibration caused by the stroke mark 103. The optical head 1a as described above is generally used for CD-ROM readers, Mini-Disk readers, and the like.

The construction of the optical head 1a is shown hereinafter in FIG. 33. FIGS. 33(A) and 33(B) is a bottom view of the optical head 1a, and FIG. 33(B) is a side elevation thereof as seen from the direction of the arrow. In these figures, reference numeral 1b denotes an optical laser pickup unit for shining light and detecting reflected light therefrom, 1c denotes an up-and-down servo for moving the optical laser pickup unit 1b in the vertical direction, 1d denotes a lens, 1e denotes the hard rubber for absorbing vibration of the hard disk 2, in the acoustic frequency band (not higher than about 10 kHz), and 1f denotes a cable for outputting acoustic signals to a sound device 202 of an acoustic inspection system 201 for hard disks. The optical laser pickup unit 1b has a gain characteristic corresponding to the distance between the lens 1d and the surface of a housing 9. That is, as shown in FIG. 34, the optical laser pickup unit 1b has the maximum gain when focusing is obtained with its gain gradually decreasing as it shifts further out of focus. As it is desirable that the other structure of the optical head 1a is supported across the horizontal plane, the optical head 1a is preferably attached to the center part of a cover 11 of the hard disk 2.

At inspection, the optical head 1a is attached to the hard disk 2 by an observer through the intermediary of the hard rubber 1e, and a vertical position of the lens 1d is adjusted by driving the up-and-down servo 1c such that the optical laser pickup unit 1b has the maximum gain. As a result, the optical head 1a is able to capture vibration of the surface of the hard disk 2 as variation in the gain thereof.

With the tenth embodiment made up as above, an error in distance between the optical laser pickup unit 1b and the hard disk 2 is corrected through compression of the hard rubber 1e, thereby preventing the optical head 1a from following the vibration of the hard disk 2, in the acoustic frequency band (not higher than about 10 KHz). Hence, with the tenth embodiment, accurate acoustic data can be acquired. Operation of the tenth embodiment is the same as that for the ninth embodiment.

As described hereinbefore, the tenth embodiment is available at low cost, and does not require careful handling while enabling accurate acoustic data to be obtained.

Eleventh Embodiment

The programs for carrying out an analysis of whether or not the stroke mark 103 is present that are used in the fifth to tenth embodiments, respectively, can be installed in a common computer via respective media. In the eleventh embodiment of the invention, a computer installed with a program for carrying out an analysis of whether or not the stroke mark 103 is present is shown.

Figure 35:
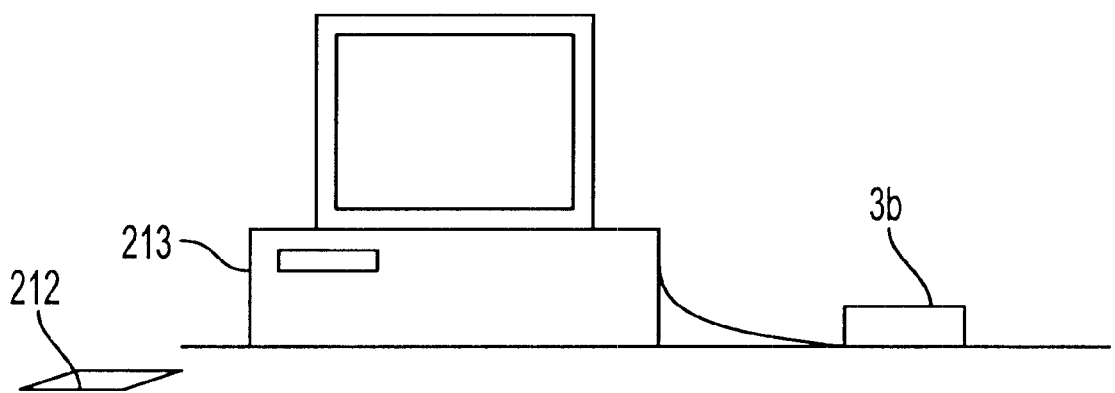
FIG. 35 is a view showing a constitution of an eleventh embodiment.

Referring to FIG. 35, the eleventh embodiment is described hereinafter. FIG. 35 is a view showing a constitution of the eleventh embodiment. In the figure, reference numeral 212 designates a medium (for example, a floppy disk, CD-ROM, DVD, etc.) storing a program for carrying out an analysis of whether or not the stroke mark 103 is present, and reference numeral 213 a common computer.

An observer installs a program for carrying out an analysis of whether or not the stroke mark 103 is present in the computer 213 via the medium 212. Subsequently, the observer reads out acoustic data on the hard disk 2 at an inspection from the memory 3b or the storage unit 210 of the acoustic inspection system 201 for hard disks. Thereafter, the observer causes the program installed in the computer 213 to start up, and to automatically carry out an analysis of whether or not the stroke mark 103 is present from the acoustic data on the hard disk 2 at inspection.

Thus, with the eleventh embodiment, an analysis of whether or not the stroke mark 103 is present can be automatically performed by use of a common computer.

Variation in Application of the Invention

Figure 36:
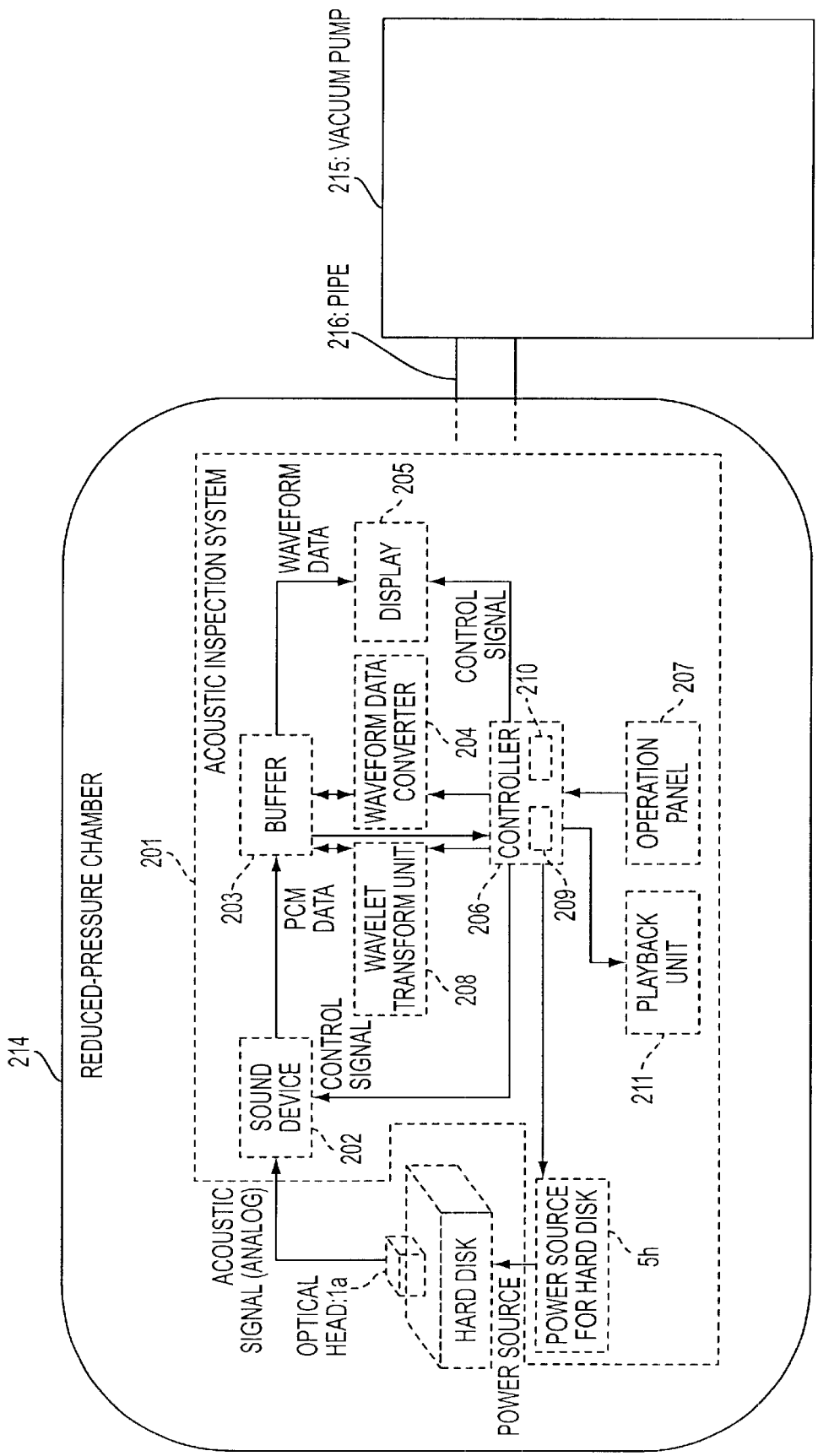
FIG. 36 is a schematic view illustrating an example of a variation in application of the invention.

With reference to the first to eleventh embodiments described hereinbefore, a case of inspecting whether or not the stroke mark 103 is present, particularly in the CSS area, has been described. However, with these embodiments described above, it is also possible to conduct inspections for checking whether or not a blemish is present in areas other than the CSS area if the inspections are conducted in a known reduced-pressure chamber as shown in FIG. 36. This is due to the fact that the head 101 of the hard disk 2, shown in FIG. 7, which is levitated by an air current, is caused to descend, and come into collision with a blemish on the surface of a disk positioned in areas other than the CSS area because air becomes thinner inside the reduced-pressure chamber.

In this case, however, there is no need for the observer applying any special work to the hard disk 2. This is because the housing 9 of the hard disk 2 is provided with a hole (not shown) for discharging internal air expanded by heat generated during operation to the outside. The hole is generally called a breath-hole, and has a filter attached thereto in order to prevent dust from making ingress into the housing.

Referring to FIG. 36, operation is described hereinafter. FIG. 36 is a view showing an example of a variation in application of the invention, indicating a case where the variation is applied to the tenth embodiment. In the figure, reference numeral 214 designates a reduced-pressure chamber, 215 a vacuum pump, and 216 a pipe for linking the reduced-pressure chamber 214 to the vacuum pump 215.

First, an observer mounts the hard disk 2 to be inspected in the acoustic inspection system 201 for hard disks, and sets parameters for inspection by manipulating the operation panel 207. Thereafter, the observer places the acoustic inspection system 201 for hard disks inside the reduced-pressure chamber 214, and starts up the vacuum pump 215. Thereupon, the vacuum pump 215 draws off air from the reduced-pressure chamber 214 through the pipe 216, and upon the pressure falling to a predetermined value, stops operation. Subsequently, the observer starts up the acoustic inspection system 201 for hard disks by manipulating a remote operation panel (not shown), whereupon the acoustic inspection system 201 for hard disks performs an inspection to decide on whether or not a blemish is present on the surface of a disk. Upon completion of the test, the observer opens a valve (not shown) of the vacuum pump 215, thereby sending air into the reduced-pressure chamber 214. Thereafter, the observer takes the acoustic inspection system 201 for hard disks out of the reduced-pressure chamber 214, and sets the acoustic inspection system 201 for hard disks are to a computer (not shown). The observer then outputs data stored in the storage unit 210 of the acoustic inspection system 201 for hard disks to the computer, and causes the computer to carry out an analysis to decide whether or not a blemish is present on the surface of a disk. In this case, the computer is able to conduct an inspection to decide whether or not a blemish is present on the surface of a disk in the whole area including the CSS area, that is, areas other than the CSS area are included.

Thus, with the first to eleventh embodiments, it is possible to conduct an inspection to decide whether or not a blemish is present on the surface of a disk in areas other than the CSS area, as well, by conducting the test in a publicly known reduced-pressure chamber.

As described in the foregoing, according to the invention, a blemish (stroke mark) inflected in the CSS area is detected from vibration propagating to the housing of a hard disk, so that the stroke mark left in the CSS area can be found without opening up the hard disk completed as a product.

With an inspection system used in conducting such an inspection, vibration propagating to the housing of the hard disk is amplified in the form of sound, and outputted to the outside. As a result, an observer can find out with ease the stroke mark left in the CSS area on the basis of the sound. It is sufficient that the inspection system described is provided with a contact microphone disposed in contact with the housing of the hard disk and used for detecting vibration propagating to the housing, and with control means for processing signals from the contact microphone, so that the same can be made up of a simple constitution. With the inspection system described, particularly, in the case that the contact microphone is caused to be in contact with a screw hole or a screw tightened up in the screw hole, provided on the base of the hard disk, the vibration can be detected with certainty.

Further, the inspection system described can comprise means for converting signals from the contact microphone into digital values, and memory means for storing digitized signals from the contact microphone. This enables the observer to perform later on an analysis of the signals from the contact microphone.

Furthermore, the inspection system described can be made up so as to comprise extraction means for extracting sound caused to occur by the head of the hard disk colliding with a stroke mark left in the CSS area. This enables the observer to hear noise caused by the stroke mark only, so that the stroke mark left in the CSS area can be found with greater ease without being misled by noise caused by something other than the stroke mark.

Still further, the inspection system described can comprise means for monitoring a condition of the hard disk, control means for turning the power source for the hard disk ON or OFF based on the condition of the hard disk as monitored, means for detecting whether or not there is a noise on the basis of vibration propagating to the housing of the hard disk, and means for varying an amplification factor for a sound to be outputted to the outside on the basis of a condition of the power source for the hard disk, and a condition of a noise. Accordingly, with the inspection system described of a simple and low-cost constitution, an inspection to decide on whether or not the stroke mark is present can be implemented. Further, the inspection system described can be made up such that the same is also provided with display means for notifying the observer of a timing ready for inspection. This enables the observer to know the timing ready for inspection. In particular, the inspection system described can be made up so as to have a constitution wherein a period of time when the amplification factor is rising signifies the timing ready for inspection. As a result, with the inspection system described, the observer can concentrate his attention on a right timing when an inspection is to be conducted, thus preventing the observer from missing the right timing for inspection.

The inspection system described can be operated such that with the elapse of a predetermined time after the power source for the hard disk is turned on, and the hard disk is turned into a ready condition, the power source for the hard disk is turned off, and in a predetermined time after the power source for the hard disk is turned off, an amplification factor of a sound to be outputted to the outside is raised while, upon disappearance of a noise, the amplification factor is caused to be reduced. Accordingly, with the inspection system described, inspection can be performed automatically without causing the observer to carry out a troublesome operation. Further, since the inspection system described can be operated while the observer monitors a condition of the hard disk, it is possible to render the hard disk to be in a condition ready for inspection, and also to control the time required for inspection at the minimum.

Furthermore, the inspection system described can comprise a display for displaying vibration propagating to the housing of the hard disk as a waveform, so that the observer can make a decision visually on whether or not the stroke mark is present. As a result, the inspection system described becomes unsusceptible to the effects of personal difference in the hearing sense of the observer and an environment at the time of inspection, so that a decision on whether or not the stroke mark is present can be made in a stable manner.

Still further, the inspection system described can comprise means for applying wavelet transform to the vibration propagating to the housing of the hard disk, converted into digital values. As a result, the inspection system described carries out an analysis on the basis of PCM data with the wavelet transform applied thereto, capable of exhibiting the characteristic thereof over time, so that a waveform having periodically steep peaks can be displayed even in case of the noise caused by the stroke mark is at a low level. This will enable the observer to make a decision with higher precision.

Furthermore, the inspection system described can be made up such that an analysis on whether or not the stroke mark is present in the CSS area is carried out by slicing a time region immediately before the spindle of the hard disk comes to a stop. With such an inspection system as described, a period of time during which the characteristic of the stroke mark is exhibited intensely is sliced before carrying out an analysis, with the result that not only the memory capacity necessary for processing data can be reduced but also the processing time can be shortened.

Still further, the inspection system described can be made up such that an analysis for a blemish on the surface of a disk in the CSS area is carried out by use of a ratio of the peak level of acoustic data to the average level thereof. Thus, since the inspection system described is made up so as to automatically carry out an analysis on whether or not the stroke mark is present, it is possible to eliminate the possibility of the observer making an erroneous decision due to differences among individuals. Furthermore, the inspection system described is no longer required to display waveforms, so that a display can be dispensed with. In such a case, it is possible to provide an acoustic inspection system for hard disks, small in size and light in weight, at a low cost. Still further, the inspection system described can be made up such that an analysis for a blemish in the CSS area on the surface of a disk is carried out by use of periodicity of peak levels appearing in acoustic data, and the deceleration characteristic of the spindle of the hard disk, thereby enabling a decision on whether or not the stroke mark is present to be made more accurately.

Yet further, the inspection system described can be made up such that parameters for a plurality of types of hard disks can be stored therein, and an analysis for a blemish in the CSS area on the surface of a disk by use of parameters corresponding to respective types of hard disks to be inspected. As a result, with the inspection system described above, the decision can be made depending on the type of a hard disk to be inspected, so that the precision with which the decision is made can be enhanced.

Further, the inspection system described can be made up such that data on a plurality of hard disks inspected can be stored therein, and outputted optionally. This enables the observer to test a large number of the hard disks without much effort forced on him.

Still further, the inspection system described can comprise means for reproducing acoustic data in an original sound condition at inspections, so that an observer is able to check later on the acoustic data in the original sound condition at the inspections, thereby enabling precision with which a decision is made to be enhanced.

Yet further, the inspection system described can comprise vibration pickup means for optically detecting vibration propagating to the housing of the hard disk. As a result, the inspection system described above is made available at low cost, and does not require careful handling while enabling more accurate acoustic data to be obtained.

Finally, programs used in carrying out analyses can be installed in a common computer via respective media. This enables an observer to analyze to decide on whether or not a stroke mark is present with the use of a common computer.

What is claimed is:

1. An acoustic inspection method for hard disks, wherein an inspection for a blemish on a disk is conducted by picking up a vibration on an external surface on a housing of a hard disk, wherein the vibration is caused by a head of the hard disk colliding with the blemish on the surface of the disk, wherein the vibration is propagated to the external surface of the housing from the head of the hard disk.

2. An acoustic inspection method for hard disks according to claim 1, wherein the inspection is conducted during a period of time when driving of the disk is stopped, and the disk is rotating by inertia.

3. An acoustic inspection system for hard disks, comprising a pickup means for picking up a vibration on an external surface of a housing of a hard disk, wherein the vibration is caused by a head of the hard disk colliding with a blemish on a surface of the disk, wherein the vibration is propagated to the external surface of the housing from the head of the hard disk.

4. An acoustic inspection system for hard disks according to claim 3, wherein the pickup means is a contact microphone.

5. An acoustic inspection system for hard disks according to claim 3, wherein the pickup means is an optical head.

6. An acoustic inspection system for hard disks according to claim 3, further comprising means for amplifying the vibration picked up by the pickup means in the form of sound, and outputting the same externally.

7. An acoustic inspection system for hard disks according to claim 3, further comprising a display for displaying as a waveform the vibration picked up by the pickup means.

8. An acoustic inspection system for hard disks according to claim 3, further comprising storage means for converting the vibration picked up by the pickup means into digital values, and storing the same.

9. An acoustic inspection system for hard disks according to claim 8, further comprising detection means for detecting a sound, caused by the head of the hard disk coming into collision with the blemish on the surface of the disk, using the digital values of the converted vibration stored by the storage means.

10. An acoustic inspection system for hard disks according to claim 9, wherein the detection means controls a power source for the hard disk, monitors a condition of vibration, and varies an amplification factor of a sound to be outputted externally.

11. An acoustic inspection system for hard disks according to claim 9, wherein the detection means notifies an observer of the occurrence of a timing indicating that the hard disc is ready for inspection.

12. An acoustic inspection system for hard disks according to claim 8, further comprising means for applying a wavelet transform to the vibration converted into digital values.

13. An acoustic inspection system for hard disk according to claim 9, wherein the detection means slices a time region immediately before rotation of the disk comes to a stop on the basis of the vibration stored by the storage means, and carries out an analysis for the blemish in the CSS area of the disk.

14. An acoustic inspection system for hard disks according to claim 9, wherein the detection means carries out an analysis for the blemish on the surface of the disk by use of a ratio of peak levels of acoustic data to average levels thereof.

15. An acoustic inspection system for hard disks according to claim 9, wherein the detection means carries out an analysis for the blemish on the surface of the hard disk by use of periodicity of peak levels appearing in acoustic data, and a reduction in rotation speed characteristic of a spindle of the hard disk.

16. An acoustic inspection system for hard disks according to claim 9, wherein the detection means is capable of storing parameters for a plurality of types of hard disks, and carrying out an analysis for a blemish on the surface of a disk by use of parameters corresponding to respective types of hard disks to be inspected.

17. An acoustic inspection system for hard disks according to claim 3, further comprising a storage means for storing acoustic data in an original sound condition at an inspection.

18. An acoustic inspection method for hard disks according to claim 1, wherein the inspection is conducted in a reduced-pressure chamber.

19. In combination with a hard disk including a housing; a disk sheet mounted rotatably within the housing, the disk sheet having a surface with a contact-start-stop (CSS) area and a read/write area thereon; and a head movable with respect to the disk sheet, a method of detecting a blemish in the CSS area of the disk sheet comprising the steps of:

attaching an acoustic pickup device to the housing;

applying a rotational force to the disk sheet thereby causing the disk sheet to rotate, whereby the head, which is in contact with the CSS area, lifts therefrom and is displaced to the read/write area of the disk sheet;

removing the rotational force from the disk sheet causing the disk sheet to decelerate, whereby the head returns from the read/write area and descends on to the CSS area; and detecting with said acoustic pickup a vibration transferred from the housing as the head returns to and descends on to the CSS area, the output of said acoustic pickup indicating the presence of a blemish on the surface of the disk sheet.

20. The method of detecting a blemish in the CSS area of a disk sheet according to claim 19 comprising the further step of amplifying the output of said acoustic pickup device only after the head has returned to the CSS area and is descending thereon.

21. The method of detecting a blemish in the CSS area of a disk sheet according to claim 20 comprising the further step of inputting the output of said acoustic pickup device to a sound producing device.

22. The method of detecting a blemish in the CSS area of a disk sheet according to claim 19 wherein the output of said acoustic pickup device is an analog signal, comprising the further steps of:

amplifying said analog signal;

converting the amplified signal into digital data;

digitizing said digital data; and inputting said digital data to a sound producing device.

23. The method of detecting a blemish in the CSS area of a disk sheet according to claim 19 wherein the output of said acoustic pickup device is an analog signal, comprising the further steps of:

converting said analog signal into digital data;

converting said digital data into waveform data; and displaying visually said waveform data.

24. The method of detecting a blemish in the CSS area of a disk sheet according to claim 23 comprising the further step of performing a wavelet transform on said digital data, the transformed digital data being converted to waveform data.

25. The acoustic inspection method for hard disks according to claim 1 comprising the further steps of:

attaching an acoustic pickup device to the housing;

applying a rotational force to the disk thereby causing the disk to rotate, whereby the head, which is in contact with a CSS area of the disk, lifts therefrom and is displaced to a read/write area of the disk;

removing the rotational force from the disk causing the disk to decelerate, whereby the head returns from the read/write area and descends on to the CSS area; and detecting with said acoustic pickup a vibration transferred from the housing as the head returns to and descends on to the CSS area, the output of said acoustic pickup indicating the presence of a blemish on the surface of the disk.

26. The acoustic inspection system of claim 8, wherein said storage means for converting the vibration is external to said external surface of a housing of the hard disk.

* * * * *